(12) United States Patent
Kuba et al.

(10) Patent No.: US 7,042,651 B2
(45) Date of Patent: May 9, 2006

(54) VARI-FOCAL OPTICAL SYSTEM

(75) Inventors: Keiichi Kuba, Hachiohji (JP); Hiroyuki Minakata, Hachiohji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/885,859

(22) Filed: Jul. 8, 2004

(65) Prior Publication Data

US 2005/0030641 A1 Feb. 10, 2005

(30) Foreign Application Priority Data

Aug. 5, 2003 (JP) .............................. 2003-206002

(51) Int. Cl.
*G02B 15/14* (2006.01)

(52) U.S. Cl. ........................................ 359/682; 359/686

(58) Field of Classification Search ................ 359/686, 359/680–683, 676, 781; 396/72, 77
See application file for complete search history.

(56) References Cited

U.S. PATENT DOCUMENTS

| | | | | |
|---|---|---|---|---|
| 5,585,970 A | * | 12/1996 | Shibayama | ................. 359/686 |
| 5,631,775 A | * | 5/1997 | Shibata | ........................ 359/683 |
| 5,805,350 A | * | 9/1998 | Yamamoto | ................... 359/686 |
| 5,999,329 A | * | 12/1999 | Ohtake | ........................ 359/686 |
| 6,163,410 A | | 12/2000 | Nagaoka | ...................... 359/654 |
| 6,317,270 B1 | | 11/2001 | Nagaoka | ...................... 359/684 |
| 6,618,198 B1 | * | 9/2003 | Endo | ........................... 359/557 |
| 6,930,839 B1 | * | 8/2005 | Hagimori et al. | ............ 359/684 |

FOREIGN PATENT DOCUMENTS

JP          10-330034          12/1998

\* cited by examiner

*Primary Examiner*—Scott J. Sugarman
*Assistant Examiner*—M. Hasan
(74) *Attorney, Agent, or Firm*—Kenyon & Kenyon LLP

(57) ABSTRACT

A vari-focal optical system having a composition comprising at least a first negative lens unit, a second positive lens unit, a third negative lens unit and a fourth positive lens unit, and changes a magnification from a wide position to a tele position by moving at least the second lens unit and the third lens unit. This optical system is configured to have a short total length and reserve sufficient airspaces for the magnification change by locating a front principal point of the second lens unit on the object side of the second lens unit.

29 Claims, 17 Drawing Sheets

VARI-FOCAL OPTICAL SYSTEM

This application claims priority to Japanese Patent Application No. 2003-206002 filed on 5 Aug. 2003, the content of which is incorporated herein by reference in its entirety.

BACKGROUND OF THE INVENTION a) Field of the Invention

The present invention relates a compact vari-focal optical system, and more specifically to a compact vari-focal optical system which is to be used in a digital camera, a portable terminal, a portable telephone and the like.

b) Description of the Prior Art

Vari-focal optical systems for compact cameras, portable terminals, portable telephones and the like which use electronic image pickup devices such as a CCD strongly require compactness or thin compositions in particular. Known as a conventional example of such a compact vari-focal optical system is an optical system which is disclosed by the following literature.

[Patent literature No. 1] Japanese Patent Kokai Publication No. Hei 10-333034

SUMMARY OF THE INVENTION

A primary object of the present invention is to provide a vari-focal optical system comprising in order from the object side: a first lens unit having a negative power; a second lens unit having a positive power; a third lens unit having a negative power; and a fourth lens unit having a positive power, wherein a magnification is changed from a wide position to a tele position by moving at least said second lens unit and said third lens unit along an optical axis, and wherein a front principal point of said second lens unit is located on the object side of the second lens unit.

Another object of the present invention is to provide the vari-focal optical system, in which wherein the first lens unit is kept stationary during the magnification change from the wide position to the tele position.

Still another object of the present invention is to provide an information processing apparatus having the vari-focal optical system comprising: an electronic image pickup device disposed at a location for receiving an image of an object formed by said vari-focal optical system; processing means for processing electronic signals photoelectrically converted by the electronic image pickup device; an input unit for allowing an operator to input desired information signals into said processing means; a display element for displaying outputs from the processing means; and a recording medium for processing the outputs from the processing means, wherein the processing means is configured to display an image of an object which is formed by the vari-focal optical system and received by the electronic image pickup device.

Still another object of the present invention is to provide a telephone apparatus having the vari-focal optical system comprising: an electronic image pickup device disposed at a location for receiving an image of an object formed by said vari-focal optical system; an antenna for transmitting or receiving telephone signals; an input unit for inputting signals such as telephone numbers; and a signal processing unit for converting the image of the object received by the electronic image pickup device.

Still another object of the present invention is to provide an electronic camera apparatus having the vari-focal optical system comprising or removably constituting: an electronic image pickup device disposed at a location for receiving an image of an object formed by said vari-focal optical system; processing means for processing electronic signals photoelectrically converted by the electronic image pickup device; a display element for visibly displaying the image of the object received by the electronic image pickup device; and a recording member which for recording information of the image of the object received by the electronic image pickup device, wherein said processing means has a display processing function for displaying the image of the object received by the electronic image pickup device on the display element and a recording processing function for recording the image of the object received by the electronic image pickup device on a recording medium.

Still another object of the present invention is to provide a vari-focal optical system described later as an embodiment and an apparatus which uses this vari-focal optical system.

DETAILED DESCRIPTION OF THE PREFERRED EMBODIMENTS

Figure 1:
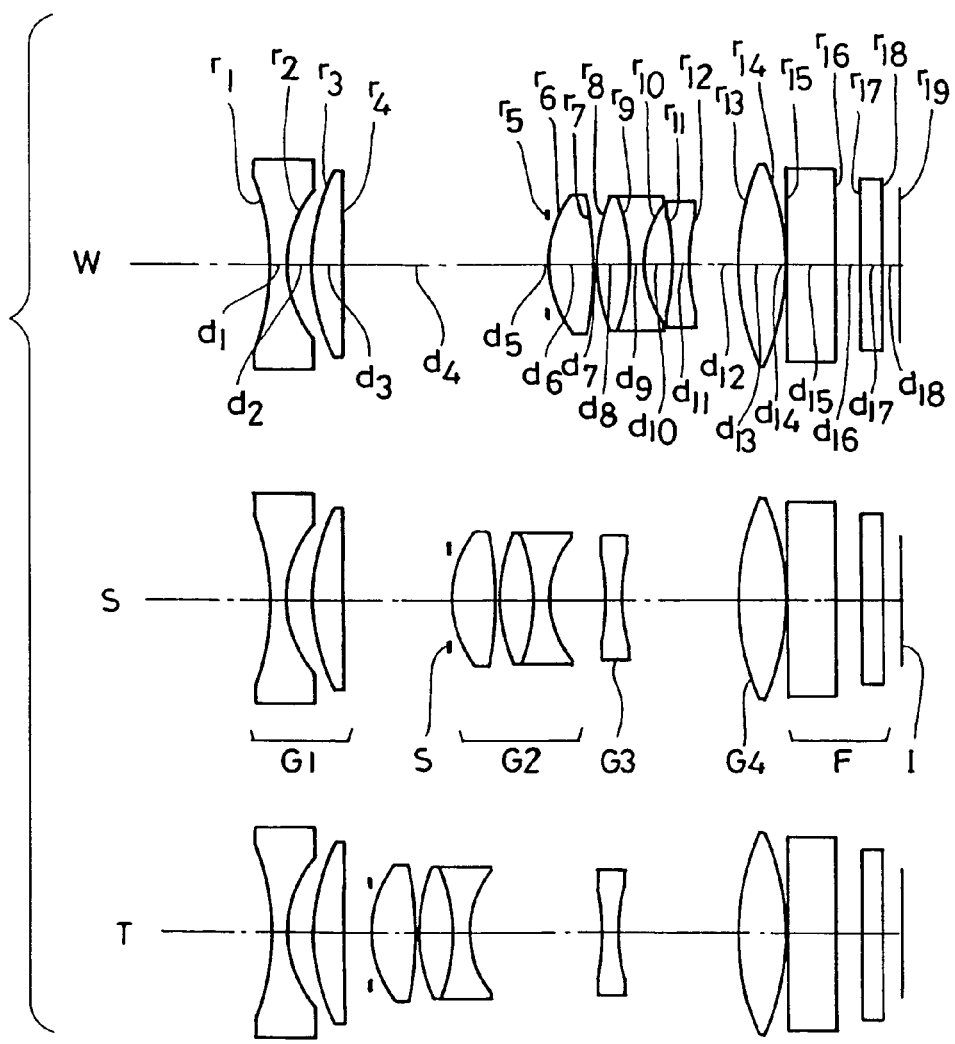
FIG. 1 is a sectional view illustrating a composition of the first embodiment of the present invention.

A vari-focal optical system comprises, in order from the object side, at least a first lens unit having negative refractive power, a second lens unit having positive refractive power, a third lens unit having negative refractive power and a fourth lens unit having positive refractive power. This vari-focal optical system moves at least the second lens unit and the third lens unit along an optical axis for changing a magnification from a wide position to a tele position. The vari-focal optical system is characterized in that a front principal point of the second lens unit is located on the object side of the second lens unit.

Since the first lens unit of this optical system has the negative refractive power, an image point of the first lens unit (an object point of the second lens unit) is situated on the object side of the second lens unit at a location after far from the second lens unit. For shortening a total length of the optical system, it is necessary to shorten a total focal length of the first lens unit and the first lens unit, an interval between principal points of the first lens unit and the second lens unit, etc.

For obtaining a high vari-focal ratio, on the other hand, it is necessary to reserve moving ranges for the second lens unit and the third lens unit to change a magnification. For meeting this requisite, it is necessary to reserve (widen) a certain airspace between the first lens unit and the second lens unit.

It is therefore difficult to find compatibility between shortening of the total length of the optical system and reservation of the airspace for the magnification change.

However, it is possible to shorten the interval between the first lens unit and the second lens unit by locating the front principal point of the second lens unit on the object side of the second lens unit. Furthermore, such a location of the principal point makes it possible to enhance a magnification of the second lens unit, thereby shortening a distance for which the second lens unit is to be moved for the magnification change. As a result, the shortening of the total length of the optical system and the reservation of the airspace for vari-focal ratio can be accomplished at the same time.

In this case, it is desirable to configure a final surface of the second lens unit as a surface concave on the image side. By configuring the final surface of the second lens unit is a surface concave toward the image side, the principal point of is shifted toward the first lens unit, thereby shortening the interval between the principal point of the first lens unit and the second lens unit. Furthermore, it is possible to shorten the total length of the optical system and since the magnification of the second lens unit can be enhanced, the moving distance of the second lens unit can be shortened.

A vari-focal optical system which has another composition is characterized in that a front principal point of a first lens unit is located on the object side of the first lens unit (on the object side of a most object side surface of the first lens unit).

Speaking more concretely, this optical system comprises, in order from the object side, at least a first negative lens unit, a second positive lens unit, a third negative lens unit and a fourth positive lens unit, and moves at least the second lens unit and the third lens unit along an optical axis for changing a magnification from a wide position to a tele position; a front principal point of the first lens unit being located on the object side of the first lens unit.

The object described optical system which uses the first lens unit having negative refractive power shifts an entrance pupil on the object side and can have a small effective diameter. Furthermore, the optical system can have a long focal length when a magnification is changed from the wide position to the tele position by moving the second lens unit and the third lens unit which narrowing an airspace between the first lens unit and the second lens unit and widening an airspace between the second lens unit and the third lens unit. Furthermore, the optical system is configured to change the magnification and correct a variation of an image surface caused by the magnification change by moving at least the second lens unit and the third lens unit along an optical axis. Furthermore, the optical system is capable of performing both the magnification change and focusing by moving the second lens unit and the third lens unit along the optical axis with the other lens units kept stationary.

When the first lens unit is configured as the lens unit which has the negative refractive power, the optical system is a retrofocus type optical system which is apt to produce negative distortion at the wide position. When the distortion is to be corrected electrically, the retrofocus type optical system is preferable since the optical system easily can easily have a wide field angle and a high vari-focal ratio. Also, the retrofocus type optical system can have a sufficiently long back focal length even at a wide position at which the optical system has a shortest focal length and easily maintain a telecentric characteristic on the image side. Furthermore, it is preferable to configure a final lens unit as a positive lens unit which makes it easier to maintain the telecentric characteristic.

For reducing an effective diameter and a total length of a lens system, it is preferable to dispose a lens element or a lens component which has negative power in the object side of the fist lens unit. Furthermore, it is preferablic for correcting aberrations such as lateral chromatic aberration to distribute positive power on the image side of the negative power on the object side of the first lens unit. By strengthening the negative power on the object side of the first lens unit so as to locate the of the front principal point of the first lens unit on the object side of an object side surface of the first lens unit, it is possible to sufficiently reduce the effective diameter and the total length of the lens system, thereby configuring the optical system compact.

Also, another vari-focal optical system has a composition comprising, in order from the object side, at least a first negative lens unit, a second positive lens unit, a third negative lens unit and a fourth positive lens unit, moves at least the second lens unit and the third lens unit along an optical axis for changing a magnification from a wide position to a tele position, and is characterized in that the first lens unit is composed of a negative lens component and a positive lens component, and that the optical system satisfies the following conditions (1) and (2):

$$-1.5 \leq fN/(fT \times fW)^{1/2} \leq -0.2 \quad (1)$$

$$0.4 > fP/(fT \times fW)^{1/2} \leq 8 \quad (2)$$

wherein reference symbols fN and fP represent focal lengths of the negative lens component and the positive lens component respectively of the first lens unit, and reference symbols fT and fW designate focal lengths of the optical system as a whole at the tele position and the wide position respectively.

The optical system allows a location of a light bundle which passes through the first lens unit to be remarkably changed by the magnification change. Lateral chromatic aberration and the like which are produced by the first lens unit on the most object side are therefore remarkably changed by the magnification change.

The first lens unit disposed on the most object side in the optical system is configured to comprise positive power and negative power for correction of offaxial aberrations such as the lateral chromatic aberration and suppression of the change of the lateral chromatic aberration caused by the magnification change. Furthermore, the optical system is configured to be capable of correcting coma of lower rays by the positive power.

For reducing an effective diameter and shortening a total length of a lens system in this case, it is preferable to dispose a lens element or a lens component having negative power on the object side in the first lens unit and a lens element or a lens component having positive power on the image side of the lens element or component having the negative power to correct the lateral chromatic aberration and the like. The negative power on the object side in the first lens unit is strengthened so as to satisfy the above mentioned condition (1). The first lens unit can therefore have a sufficiently small effective diameter. If an upper limit of the condition (1) is exceeded, the negative power will be too strong, whereby remarkable aberrations produced by the first lens unit can hardly be corrected. If $fN/(fT \times fW)^{1/2}$ is smaller than a lower limit of −1.5 of the condition (1), an effect to reduce the diameter of the lens unit will be lowered.

Furthermore, the positive power of the first lens unit is strengthened enough to satisfy the condition (2), thereby correcting aberrations such as the lateral chromatic aberration produced in the first lens unit. If an upper limit of the condition (2) is exceeded, an effect to correct the lateral chromatic aberration and the like will be lowered. If $fP/(fT \times fW)^{1/2}$ is smaller than a lower limit of 0.4 of the condition (2), an effect to reduce the diameter of the lens system will be lowered.

When distortion is to be corrected not optically but electrically, the optical system which satisfies the above mentioned conditions (1) and (2) is capable of producing negative distortion at the wide position, thereby having a wide field angle and a high vari-focal ratio.

It is preferable to satisfy, in place of the conditions (1) and (2), the following conditions (1-1) and (1-2) which makes it possible to configure the optical system more compact while maintaining favorable optical performance; (2-1):

$$-1 \leq fN/(fT \times fW)^{1/2} \leq -0.3 \quad (1\text{-}1)$$

$$0.6 \leq fP/(fT \times fW)^{1/2} \leq 6 \quad (2\text{-}1)$$

It is preferable to satisfy, in place of the above mentioned conditions, the following conditions (1-2) and (2-2), which makes it possible to configure the optical system more compact while maintaining the favorable optical performance:

$$-0.8 \leq fN/(fT \times fW)^{1/2} \leq -0.45 \quad (1\text{-}2)$$

$$0.8 \leq fP/(fT \times fW)^{1/2} \leq 4.5 \quad (2\text{-}2)$$

It is more preferable for correction of aberrations to configure the first lens unit so as to comprise a biconcave lens element and a positive lens element having a convex surface on the object side.

Also, a vari-focal optical system which has another composition comprises, in order from the object side, at least a first negative lens unit, a second positive lens unit, a third negative lens unit and a fourth positive lens unit, moves at least the second lens unit and the third lens unit along an optical axis for changing a magnification from a wide position to a tele position and is characterized in that the first lens unit comprises a negative lens element having a biconcave shape.

For obtaining effects such as these described above when the first lens unit of the vari focal optical system according to the present invention is to comprise negative power and positive power as described above, it is preferable that the first lens unit comprises a negative lens component having two concave surfaces. The negative lens component makes it possible to compose the first lens unit of lens elements in a number as small as possible, thereby facilitating to configure the optical system compact.

Speaking concretely, it is preferable that the vari-focal optical system comprises, in order from the object side, at least a first negative lens unit, a second positive lens unit, a third negative lens unit and a fourth positive lens unit, and moves at least the second lens unit and the third lens unit to change a magnification from a wide position to a tele position, and that the first lens unit comprises a negative lens component having a biconcave shape.

When a first lens unit which comprises a negative biconcave lens component as described above facilitates to configure the optical system compact while maintaining favorable optical performance.

For the vari focal optical system which has any of the above described compositions, it is preferable to keep the first lens unit while the magnification is changed from the wide position to the tele position.

The first lens unit has a large effective diameter and a heavy weight, if such a first lens unit is moved along the optical axis for the magnification change, this lens unit will constitutes a burden on an actuator and requires a complicated mechanism. When the fist lens unit is kept stationary, a collapsible mechanism is unnecessary thereby making it possible to configure a photographing apparatus compact. Furthermore, a first lens unit which is kept stationary is preferable since such a lens unit allows to use a simple mechanism and enhances a durability of a photographing apparatus. Furthermore, such a lens unit facilitates to configure a waterproof photographing apparatus. For reasons described above, it is preferable to perform the magnification change and focusing.

When a first lens unit is movable in a vari-focal optical system having a negative-positive-negative-positive power distribution, the optical system is configure to move the first lens unit on the image side and then return the lens unit on the object side. When the first lens unit is kept stationary during the magnification change, a required back focal length can be reserved at a wide position. When focusing is to be performed at a tele position by moving the first lens unit disposed on the most object side, the lens unit must be moved for a long distance, thereby enlarging the optical system.

It is desirable to configure the above described vari-focal optical system according to the present invention so that a radius of curvature r1 on a most object side surface (a first surface of the optical system) satisfies the following condition (3);

$$-70 \leq r1 \ (mm) \quad (3)$$

When the condition (3) is satisfied, the first surface has strong power strong power of the first surface shifts an entrance pupil on the object side, thereby making it possible to configure the optical system compact.

Furthermore, it is preferable to satisfy, in place of the condition (3), the following condition (3-1), which makes it possible to configure the optical system more compact:

$$-30 \leq r1 \; (mm) \qquad (3\text{-}1)$$

Furthermore, the optical system can be configure more compact when the optical system satisfies, in place of the condition (3-1), the following condition (3-2):

$$-15 \leq r1 \; (mm) \qquad (3\text{-}2)$$

Furthermore, it is more desirable for the vari-focal optical system to compose the second lens unit of a positive lens component and a negative lens component in order from the object side.

In other words, the optical system comprises, in order from the object side, at least a first negative lens unit, a second positive lens unit, a third negative lens unit and a fourth positive lens unit, and moves at least the second lens unit and the third lens unit along an optical axis to change a magnification from a wide position to a tele position; the second lens unit comprising a positive lens component and a negative lens component in order from the object side.

In the vari-focal optical system, the second positive lens unit functions to converge a light bundle which is diverged by the first negative lens unit. It is therefore preferable that a lens unit on the object side in the second lens unit is a positive lens component. Furthermore, when the second lens unit consists of a positive lens component and a negative lens component as described above, the principal point is shifted toward the first lens unit. It is therefore possible to shorten the interval between the principal points of the first lens unit and the second lens unit, thereby shortening the total length of the optical system. Furthermore, it is possible to enhance a magnification of the second lens unit, thereby shortening a moving distance of the second lens unit. Since a wide airspace is reserved between the first lens unit and the second lens unit so far as a focal length of the second lens unit remains unchanged, reservation of a space between the first lens unit and the second lens unit does not constitute a restrictive requisite. Since the second lens unit comprises the positive lens component and the negative lens component, the optical system is capable of preventing aberrations such as chromatic aberration from being varied by the magnification change.

It is easy to prevent the above described aberrations such as chromatic aberration using a small number of lens components when a lens component on the object side in the second lens unit has positive power and a lens component disposed on the image side of the positive lens component has negative power.

Even when three lens components of an eighth embodiment disclosed by Japanese patent Kokai publication No. Hei 10-333034 is grouped into positive+(positive+negative) lens components, we obtain positive+(positive+negative) lens components=positive+positive lens components, whereby it is impossible to obtain such as effect as that described above.

Also, it is preferable for the optical system to configure the second lens unit so as to comprise at least two positive lens components and a negative lens component.

The second lens unit must converge a light bundle diverged by the fist lens unit having the negative power as described above. In order to allow the second lens unit to sufficiently converge the light bundle while maintaining favorable performance, it is preferable to configure the second lens unit so as to comprise at least two positive lens components. Furthermore, it is necessary for configuring the optical system compact to strengthen power of each lens unit. When positive power of the second lens unit is strengthened, a lateral magnification and aberrations are varied remarkably by the magnification change. For correcting aberrations produced in the second lens unit and preventing aberrations from being varied by the magnification change, it is preferable to configure the second lens unit so as to comprise two positive lens components.

In this case, it is preferable that a positive lens component on the most object side in the second lens unit has strongest positive power out of lens components disposed in this lens unit since such a lens unit sufficiently converges a light bundle and allow the optical system to be configured compact. At this time, it is preferable to compose the second lens unit of positive, positive and negative lens elements in order from the object side.

Furthermore, it is more preferable to compose the second lens unit, in order from the object side, of a positive lens component, and a cemented lens component consisting of a positive lens element and a negative lens element. This cemented lens component is preferable since the lens component can correct chromatic aberration produced in the lens system, lessen influences due to an eccentric error between the lens elements composing the lens component and allow a simple mechanism to be used. In this case, the principal point is shifted toward the first lens unit by imparting negative refractive power to the cemented lens component consisting of the positive lens element and the negative lens element. Such a cemented lens component can therefore narrow the interval between the first lens unit and the second lens unit, thereby shortening the total length of the optical system. Furthermore, the cemented lens component permits enhancing the magnification of the second lens unit, thereby shortening a moving distance of the second lens unit for the magnification change. When the focal length of the second lens unit remains unchanged, the airspace between the first lens unit and the second lens unit is wide, whereby the reservation of the interval between the first lens unit and the second lens unit for the magnification change does not constitute the restrictive requisite.

Also, the principal point of the second lens unit is shifted toward the first lens unit by composing the cemented lens component of a biconvex lens element and biconcave lens element in order from the object side so that the cemented lens component has a concave surface on the image side. Such a cemented lens component can narrow the interval between the principal points of the first lens unit and the second lens unit, thereby shortening the total length of the optical system. Furthermore, the cemented lens component permits enhancing the magnification of the second lens unit, thereby shortening the moving distance of the second lens unit for the magnification change. Furthermore, the cemented lens component can have stronger negative power, thereby being capable of correcting chromatic aberration produced in the second lens unit and preventing chromatic aberration from being varied by the magnification change.

In the optical system, the second lens unit produces aberrations in a direction to cancel aberrations produced by the first lens unit. At the wide position at which the first lens unit is apt to produce outer coma, for example, the coma can be corrected in the optical system as a whole by configuring a final surface of the second lens unit (an image side surface of the cemented lens component) as a surface concave on the image side which produces inner coma. This final concave surface of the second lens unit is apt to produce aberrations of high orders. It is therefore preferable to configure this surface as an aspherical surface. In this case, it is preferable that this aspherical surface has such a shape as to exhibit an aspherical surface function to strengthen paraxial power as portions of the aspherical surface are farther from the optical axis.

When the second lens unit of the optical system is composed of positive, positive and negative lens elements, it is preferable to satisfy the following conditions (4), (5) and (6):

$$0.4 \leq f21/(fT \times fW)^{1/2} \leq 3 \quad (4)$$

$$1 \leq f22/(fT \times fW)^{1/2} \leq 3 \quad (5)$$

$$-5 \leq f23/(fT \times fW)^{1/2} \leq -0.1 \quad (6)$$

wherein a reference symbol f21 represents a focal length of the positive lens element on the most object side in the second lens unit, a reference symbol f22 designates a focal length of the second positive lens element in the second lens unit, a reference symbol f23 denotes a focal length of the third negative lens element in the second lens unit.

In the optical system, the second lens unit functions to converge the light bundle diverged by the first lens unit. For sufficiently converge the light bundle while maintaining favorable optical performance, it is preferable for the second lens unit to satisfy the above mentioned conditions (4), (5) and (6).

If an upper limit of 3 of the condition (4) is exceeded, the second lens unit cannot sufficiently converge the light bundle diverged by the first lens unit having the negative power. The second lens unit will therefore have a large effective diameter. If $f21/fT \times fW)^{1/2}$ is smaller than a lower limit of 0.4 of the condition (4), in contrast, the positive lens element on the object side in the second lens unit will have too strong power, thereby making it difficult to correct aberrations.

If an upper limit of 3 of the condition (5) is exceeded, similarly the second lens unit cannot sufficiently converge the light bundle diverged by the first lens unit having the negative power. The second lens unit will therefore have a large effective diameter. If $f22/(fT \times fW)^{1/2}$ is smaller than a lower limit of 1 of the condition (5), in contrast, the second positive lens unit in the second lens unit will have too strong a power, thereby making it difficult to correct aberrations.

If an upper limit of the condition (6) is exceeded, the third negative lens element in the second lens unit will have too strong power, thereby making it difficult to correct aberrations. If $f23/(fT \times fW)^{1/2}$ is smaller than a lower limit of −5 of the condition (6), chromatic aberration will be corrected insufficiently and the effect to shift the principal point of the second lens unit will be lowered.

It is more preferable to satisfy, in place of the conditions (4), (5) and (6), the following conditions (4-1), (5-1) and (6-1), which make it possible to configure the optical system while maintaining favorable optical performance:

$$0.5 \leq f21/(fT \times fW)^{1/2} \leq =2 \quad (4-1)$$

$$0.2 \leq f22/(fT \times fW)^{1/2} \leq 2 \quad (5-1)$$

$$-1 \leq f23/(fT \times fW)^{1/2} \leq -0.2 \quad (6-1)$$

Furthermore, it is more preferable to satisfy, in place of the above mentioned conditions, the following conditions (4-2), (5-2) and (6-2), which make it possible to configure the optical system more compact while maintaining the favorable optical performance:

$$0.6 \leq f21/(fT \times fW)^{1/2} \leq 1.3 \quad (4-2)$$

$$0.3 \leq f22/(fT \times fW)^{1/2} \leq 1 \quad (5-2)$$

$$-0.7 \leq f23/(fT \times fW)^{1/2} \leq -0.3 \quad (6-2)$$

For the vari-focal optical system, it is desirable that the second lens unit is composed, in order from the object side, of a positive lens element and a cemented lens consisting of a positive lens element and a negative lens element, and satisfy the following condition (7):

$$-2 \leq (fT \times fW)^{1/2}/f2CE \leq 2 \quad (7)$$

wherein a reference symbol f2CE represent a focal length of the cemented lens component of the second lens unit.

If an upper limit 2 of the condition (7) is exceeded, chromatic aberration will be corrected insufficiently. If $(fT \times fW)^{1/2}/f2CE$ is smaller than a lower limit of −2 of the condition (7), in contrast, the negative lens element of the cemented lens component will have too strong power, thereby producing aberrations in large amounts.

Furthermore, it is more preferable to satisfy, in place of the condition (7), the following condition (7-1):

$$-1 \leq (fT \times fW)^{1/2}/f2CE \leq 1 \quad (7-1)$$

Furthermore, it is more desirable to satisfy, in place of the above mentioned condition, the following condition (7-2):

$$-0.7 \leq (fT \times fW)^{1/2}/f2CE \leq 0.7 \quad (7-2)$$

For the optical system, it is desirable that the second lens unit comprises lens elements made of glass materials which have an Abbe's number difference Δv satisfying the following condition (A):

$$\Delta v \geq 20 \quad (A)$$

The optical system moves the second lens unit along the optical axis for changing the magnification from the wide position to the tele position. When the second lens unit comprises the lens elements made of the glass materials satisfying the condition (A), the optical system is capable of preventing aberrations such as chromatic aberration from being varied by the magnification change.

Furthermore, it is more desirable to satisfy, in place of the above described condition (A), the following condition (A-1), which enhances an effect to correct chromatic aberration:

$$\Delta vd \geq 26 \quad (A-1)$$

When the second lens unit has a composition comprising a positive and negative lens components in succession in order from the object side, it is more desirable to satisfy the following condition (A-2):

$$\Delta v \geq 10 \quad (A-2)$$

Furthermore, it is preferable to satisfy, in place of the above mentioned condition (A-2), the following condition (A-3):

$$\Delta v \geq 17 \quad (A-3)$$

Also, a vari-focal optical system which has another composition comprises, in order from the object side, at least a first negative lens unit, a second positive lens element, a third negative lens unit and a fourth positive lens unit, moves at least the second lens unit and the third lens unit along an optical axis for changing a magnification from a wide position to a tele position, and is characterized in that an image side principal point of the third lens unit is located on the object side of a final surface (most image side surface) of the third lens unit.

The vari-focal optical system moves the second lens unit and the third lens unit along the optical system to change the magnification. When the image side principal point of the third lens unit is located on the object side of the final surface of the third lens unit in such an optical system, it is possible to narrow an interval between principal points of an optical system composed of the second lens unit and the third lens unit. Such a narrow interval between the principal points is preferable for configuring the optical system compact.

Also, a vari-focal optical system which has another composition comprises, in order from the object side, at least a first negative lens unit, a second positive lens unit, a third negative lens unit and a fourth positive lens unit, moves at least the second lens unit and the third lens unit along an optical axis to change a magnification from a wide position to a tele position, and is characterized in that the third lens unit consists of a biconcave lens element.

For the vari focal optical system, it is preferable to configure the third lens unit so as to cancel aberrations produced by the second lens unit which has positive power. At the wide position, for example, the second lens unit is apt to produce outside coma. For canceling this coma, it is desirable to produce inside coma by configuring a final surface of the third lens unit as a surface concave on the image side. This concave surface makes it possible to correct coma favorably in the optical system as a whole. In order words, it is preferable to configure an image side surface of the third lens unit as a surface concave on the image side. Furthermore, it is preferable to configure an object side surface of the third lens unit as a surface concave on the object side for correcting coma and astigmatism produced by the second lens unit. For reasons described above, it is desirable to configure the third lens unit as a biconcave negative lens element having a biconcave shape or a concave surface on the object side for configuring the optical system compact by composing the optical system of a small number is lens elements and imparting negative power to the optical system. Furthermore, the biconcave negative lens element which has the narrow interval between the principal points is preferable for configuring the optical system compact.

Also, another vari-focal optical system comprises, in order from the object side, at least a first negative lens unit, a second positive lens element, a third negative lens unit and a fourth positive lens unit, moves at least the second lens unit and the third lens unit along an optical axis to change a magnification from a wide position to a tele position, and is characterized by satisfying the following condition (8):

$$-5 \leq f3/(fT \times fW)^{1/2} \leq -0.4 \tag{8}$$

wherein a reference symbol f3 represents a focal length of the third lens unit.

Since the first lens unit of the optical system has negative refractive power, an image point of the first lens unit (an object point of the second lens unit) is situated at a location rather far from the second lens unit on the object side. For shortening a total length of the optical system, it is therefore necessary to shorten a total focal length of the second lens unit and the third lens unit, as interval between principal points of the first lens unit and the second lens unit and the like.

For maintaining a high vari-focal ratio, on the other hand, it is necessary to reserve ranges for moving the second lens unit and the third lens unit to change the magnification. For meeting this requisite, it is necessary to reserve an airspace at a certain degree between the first lens unit and the second lens unit. As a result, it is difficult to find compatibility between the shortening of the total length of the optical system (shortening of the total focal length of the second lens unit and the third lens unit) and reservation of a spaced for the magnification change. When an optical system to be moved for the magnification change (an optical system composed of the second lens unit and the third lens unit) is configured as a telephoto type optical system which has a positive negative power distribution, however, a front principal point of the composite optical system of the second lens unit and the third lens unit is located on the object side of the second lens unit. The telephoto type optical system therefore serves to narrow an interval between principal points of an optical system composed of the first lens unit, the second lens unit and the third lens unit. The telephoto type optical system further permits narrowing a total focal length of the second lens unit and the third lens unit. Since the telephoto type optical system also allows the magnification of the second lens unit to be enhanced, thereby shortening the moving distance of the second lens unit for the magnification change. As a result, the telephoto type optical system makes it possible to shorten the total length of the optical system, reserve spaces for the magnification change and obtain a high vari-focal ratio at the same time.

For shortening the total focal length of the second lens unit and the third lens unit as described above, it is desirable that the third lens unit has a focal length satisfying the above mentioned condition (8).

If an upper limit of −5 of the condition (8) is exceeded, the third lens unit will have too weak negative power, thereby making it difficult to obtain the above described effect. If $f3/(fT \times fW)^{1/2}$ is smaller than a lower limit of 0.4 of the condition (8), in contrast, the third lens unit will have too strong negative power and the other lens unit will have strong power, thereby making it difficult to correct aberrations in the optical system. In addition, it will be impossible to obtain a long back focal length.

For making it possible to configure the optical system more compact while maintaining favorable optical performance, it is preferable to satisfy, in place of the condition (8), the following condition (8-1):

$$-3 \leq f3/(fT \times fW)^{1/2} \leq -0.6 \tag{8-1}$$

Furthermore, it is more preferable to satisfy, in place of the condition (8-1), the following condition (8-2), which makes it possible to configure the optical system more compact while maintaining the favorable optical performance:

$$-2.5 \leq f3/(fT \times fW)^{1/2} \leq -0.8 \tag{8-2}$$

Also, an optical system which has another composition comprises, in order from the object side, at least a first negative lens unit, a second positive lens unit, a third negative lens unit and a fourth positive lens unit, moves at least the second lens unit and the third lens unit along an optical axis to change a magnification from a wide position to a tele position, and is characterized by satisfying the following condition (9):

$$-9 \leq \beta 3S/\beta 2S \leq -0.5 \tag{9}$$

wherein a reference symbol β2S represents a magnification of the second lens unit when the optical system has a standard focal length fS[fS=(fT×fW)$^{1/2}$] as a whole and a reference symbol β3S designates a magnification of the third lens unit when the optical system has the focal length fS as a whole.

When the condition (9) is satisfied, a focusing amount (moving distance of the third lens unit) can be reduced when the third lens unit is to be moved for focusing.

If an upper limit of −0.5 of the condition (9) is exceeded, a magnification of the third lens unit will be lowered, thereby prolonging the moving distance of the third lens unit. Accordingly, reservation of an interval between the this lens unit and the fourth lens unit at the tele position constitutes a restrictive requisite for design of the optical system. If β3S/β2S is smaller than a lower limit of −9 of the condition (9), in contrast, the magnification of the second lens unit is lowered and the second lens unit has a long moving distance, thereby making it difficult to shorten the total length of the optical system.

It is more preferable to satisfy, in place of the condition (9), the following condition (9-1), which makes it possible to configure the optical system more compact while maintaining favorable optical performance:

$$-7 \leq \beta 3S/\beta 2S \leq -1 \quad (9\text{-}1)$$

Furthermore, it is more preferable to satisfy the following condition (9-2):

$$-5 \leq \beta 3S/\beta 2S \leq -1.8 \quad (9\text{-}2)$$

It is preferable to move the third lens unit for focusing the vari-focal optical system which has each of the above described compositions.

When the second lens unit having the positive power is moved for focusing the vari-focal optical system as an object point approaches a near point from an infinite distance, it is necessary to move the second lens unit having the positive power on the object side. The second lens unit is moved in a direction which is the same as a direction in which the second lens unit is moved along the optical axis for the magnification change from the wide position to the tele position. When the second lens unit is moved for the focusing, the second lens unit therefore has a long moving distance, thereby making it difficult to shorten the total length of the optical system. Furthermore, a heavy burden is imposed on an actuator which is used for moving the lens unit.

Also, the second lens unit converge rays diverged by the first lens unit having the negative power. For sufficiently converging a light bundle while maintaining favorable performance, it is desirable to compose the second lens unit of a plurality of lens elements. As a result, the second lens unit has a heavy weight. It is difficult to perform the focusing by moving such a heavy second lens unit.

When the optical system is to be focused by moving the third lens unit having the negative power, it is sufficient to move the third lens unit on the image side along the optical axis. It is unnecessary to widen a moving range when the third lens unit having the negative power is to be moved for the focusing. As a result, the moving range for the lens unit does not constitute a restrictive requisite for design. In addition, a mechanism for moving the lens unit may be simple. Since the third lens unit has an effective diameter which is not so large, a focusing speed is enhanced.

When the optical system consisting of the negative, positive, negative and positive lens units is configured sufficiently compact, a lateral magnification β3 of the third lens unit for the magnification change does not include a location of |β3|=1. Accordingly, the third lens unit has a magnification higher than that of the second lens unit having the positive refractive power and the fourth lens unit having the positive refractive power, thereby requiring a shorter moving distance.

Compared with an optical system which consists of negative, positive, positive and positive lens units, an optical system which consists of negative, positive, negative and positive lens units like the optical system has a narrower interval between a first lens unit and a second lens unit and a shorter total focal length of the first lens unit and the second lens unit for focusing by moving a third lens unit. Therefore, a short moving range of the third lens unit is sufficient for the focusing. As a result, reservation of the lens moving range does not constitute a restrictive requisite for design of the optical system and a mechanism for moving the lens unit may be simple.

When the third lens unit consists of a single negative lens element as described above in this case, the third lens unit has a light weight, a burden is light on a lens driving mechanism for the focusing and a short time is sufficient for the focusing.

When the second lens unit and the third lens unit are to be moved for changing a magnification as in the optical system, focusing is performed by moving the lens units which are moved along an optical axis for the magnification change and a mechanism for moving the lens units may be preferably simple.

When the optical system is to be focused by moving the third lens unit as described above, it is desirable that the third lens unit has a volume not exceeding 25 mm$^3$ as measured at an effective diameter of the lens unit.

When the third lens unit has the volume not exceeding 25 mm$^3$ as described above, a burden on an actuator is light and focusing can be performed at a high speed.

Furthermore, it is desirable that the first lens unit of the optical system has at least an aspherical surface.

In the optical system, rays are incident on high portions of the first lens unit which is disposed on the most object side. It is therefore possible to effectively correct offaxial aberrations such as distortion, astigmatism and coma by configuring the first lens unit so as to have at least an aspherical surface.

For configuring the optical system so as to have a wide field angle, a high vari-focal ratio and a compact design, image distortion of is to be corrected not optically but electronically. In this case, the first lens unit which has an aspherical surface is capable of effectively producing image distortion. At this time, a highest effect can be obtained when an aspherical surface is used as a most object side surface of the first lens unit. It is preferable that this aspherical surface has an aspherical surface function to weaken paraxial power as portions of the aspherical surface are farther from the optical axis.

Also, it is preferable to configure the final convex surface of the first lens unit as an aspherical surface. At this time, it is preferable that the aspherical surface has a function to strengthen paraxial power as portions of the aspherical surface are farther from the optical axis.

Furthermore, the second lens unit of the optical system may have an aspherical surface.

Since a diameter of a light bundle is enlarged by the first lens unit, a light bundle which has a large diameter is incident on the second lens unit. It is therefore preferable for favorable correction of aberrations to configure the second lens unit so as to have at least an aspherical surface. Furthermore, it is necessary for configuring the optical system compact to strengthen power of each lens unit. When the positive power of the second lens unit is strengthened, lateral magnification of the second lens unit and aberrations are varied remarkably by the magnification change. For reducing the variations of aberrations due to the magnification change by favorably correcting aberrations produced by the second lens unit, it is therefore preferable to configure the second lens unit so as to comprise two positive lens components or an aspherical surface.

It is desirable in this case to configure the object side surface of the second lens unit or a surface of the second lens unit which faces the aperture stop as an aspherical surface, which makes it possible to favorably correct spherical aberration. It is preferable for this aspherical surface to have a shape which has an aspherical surface function to weaken paraxial power as portions of the aspherical are farther from the optical axis. Such an aspherical surface shape is capable of preferably suppressing production of positive spherical aberration in the second lens unit.

Also, it is possible to effectively correct offaxial aberrations such as astigmatism and coma by configuring a most image side surface of the negative lens element of the second lens unit.

Aberrations of high orders are apt to be produced when a final surface of the second lens unit is a concave surface of the negative lens element which is concave on the image side. These aberrations of the high orders can be suppressed by configuring the above described concave surface as an aspherical surface. It is preferable that this aspherical surface has a shape which functions to strengthen the paraxial power as the portions of the aspherical surface are farther from the optical axis.

Furthermore, it is more preferable to dispose two aspherical surfaces as a most object side surface of the second lens unit and an image side surface of the negative lens component of the second lens unit. When these two surfaces are configured as aspherical surfaces, the surfaces correct aberrations in remarkably large amounts, thereby being capable of preventing spherical aberration from being varied in the second lens unit during the magnification change and correcting astigmatism produced in the second lens unit. Furthermore, the positive lens component and the negative lens component of the second lens unit preferably have a shape close to a shape of a cemented lens component, thereby reducing performance degradation to be caused by cementing, and further shortening moving distances of the second lens unit and the third lens unit.

All aberrations produced by the second lens unit can be corrected effectively by configuring the two surfaces as the aspherical surfaces since the aspherical surface disposed as the image side surface of the negative lens element of the second lens unit has a function to cancel all aberrations, for example, spherical aberration, coma, astigmatism and distortion produced by a spherical surface effect (aberrations produced by a spherical surface) of the second lens unit.

Also, the fourth lens unit of the optical system may have an aspherical surface.

In the vari-focal optical system, rays are incident to high portions of a most image side lens unit. It is therefore possible to effectively correct offaxial aberrations such as distortion, astigmatism and coma as well as pupil aberrations by disposing at least an aspherical surface as a surface of the fourth lens unit. It is preferable that the aspherical surface which is to be used as the surface of the fourth lens unit has an aspherical surface function to weaken paraxial power as portion of the aspherical surface are farther from the optical axis.

In this case, it is desirable that the fourth lens unit consists of a single positive lens elements. For shortening the total length of the optical system, it is sufficient to configure the fourth lens unit so as to control mainly a pupil location. In this case, it is unnecessary to compose the fourth lens unit of so large a number of lens elements. When the fourth lens unit consists of a single positive lens element, an effect to control the pupil location is obtained with a small number of lens element. In this case, it is preferable for correction of aberrations to compose the fourth lens unit of a single biconvex lens element.

Also, it is desirable for the optical system to keep the fourth lens unit stationary for the magnification change from the wide position to the tele position and focusing.

By keeping the most object side lens unit stationary for the magnification change, it is possible to prevent aberrations and the pupil location from bring varied by the magnification change.

When the vari-focal optical system comprises a lens unit to be returned on the object side after being moved on the image side (U-turn lens unit) and a lens unit to be moved only on the object side (monotonously moving lens unit) out of the lens units which are to be moved for the magnification change, it is possible to use the optical system only at the wide position and the tele position while using the monotonously moving lens unit only at the wide position and the tele position with the U-turn lens unit kept at a location for the wide position and the tele position.

Figure 13:
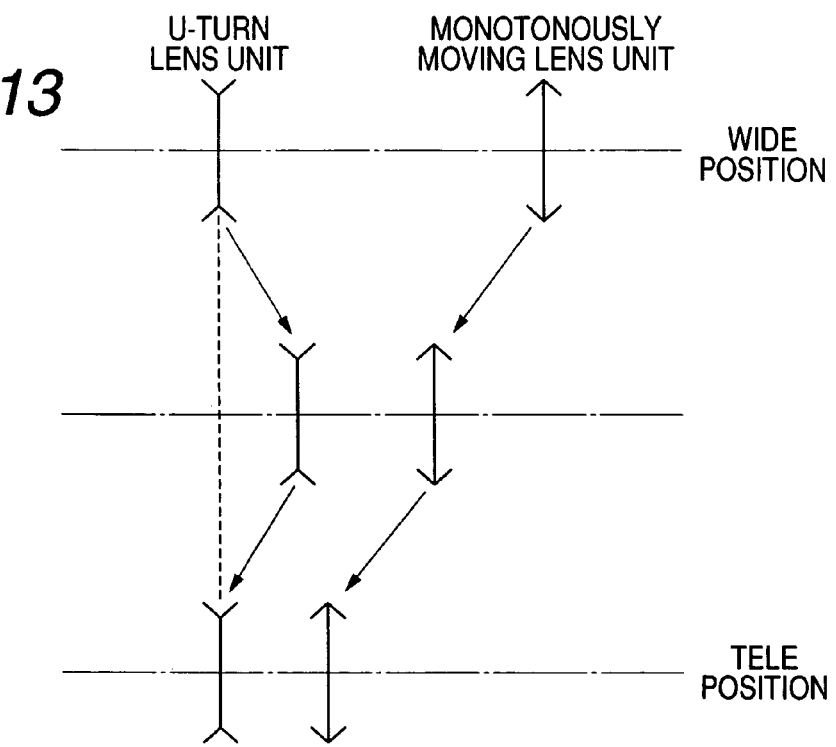
FIG. 13 is a diagram descriptive of a case where the optical system according to the present invention is to be used while switching between a wide position and a tele position.

When the U-turn lens unit is returned on the object side after being moved from the wide position (an upper stage) to the tele position (a lower stage) and a location for the wide position is identical to that for the tele position as shown in FIG. 13, the monotonously moving lens unit is moved from the location for the wide position directly to that for the tele position. The optical system may be used also at the wide position and the tele position by moving the monotonously moving lens unit as described above.

When the U-turn lens unit is kept stationary during magnification changes to the wide position and the tele position in the optical system as described above, a number of moving lens is reduced and a mechanism is simplified, thereby making it easy to configure the optical system compact. Furthermore, since the optical system is used only at the wide position and the tele position, switching between the wide position and the tele position may be performed by manually moving the moving lens units. In this case, an actuator is unnecessary. When the U-turn lens unit is not returned completely on the object side and the location for the wide position is not identical to that for the tele position, the optical system may be used by moving only the moving lens units with the U-turn lens unit kept stationary at the location for the tele position. Though use at the wide position is somewhat sacrificed, such use of the optical system makes it possible to reduce a number of the moving lens units and simplify a mechanism, thereby configuring the optical system compact.

The optical system according allows distortion to be corrected electrically.

When distortion is to be corrected in the optical system, the optical system requires a large number of lens elements, thereby being enlarged. By electronically correcting distortion which cannot be corrected sufficiently in the optical system, it is possible to configure the optical system more compact. When distortion does not exceed 20%, the electronic correction of distortion permits obtaining favorable image quality when distortion does not exceed 20%.

Also, the retrofocus type optical system produces remarkable distortion at the wide position. The electronic correction of distortion is therefore preferable for widening an field angle and enhancing a vari-focal ratio of the optical system.

Also, the optical system according to the present invention is characterized in that the optical system produces distortion in a maximum amount of 30% and comprises an optical path bending optical system.

In a case where a field angle of an optical system which consists of negative, positive, negative and positive lens units like the optical system is to be enlarged by electronically correcting distortion, it is proper to produce distortion at a wide position and correct the distortion electronically. If distortion is larger than −30% in this case, a correcting magnification will be high at a marginal portion of an image surface and an image will be rough after the electronic correction. It is therefore preferable that a maximum amount of distortion does not exceed 30%.

Also, it is desirable that a maximum correcting magnification does not exceed 2× for the electronic correction of distortion.

Figure 14:
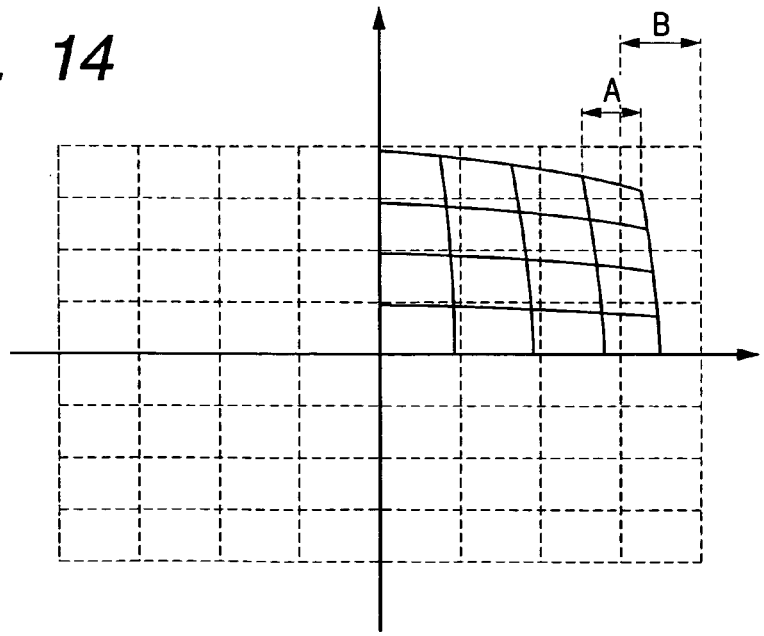
FIG. 14 is a diagram descriptive of an enlarging magnification of the optical system according to the present invention.

When distortion is produced as shown in FIG. 14, for example, it is necessary to correct the distortion as shown in FIG. 14.

Since distortion is different dependently on image heights, a correcting magnification B/A is dependently on images. An image quality is degraded at a location at which the correcting magnification is high (a marginal portion of an image surface in most cases). Furthermore, since an optical system is designed so as to make a paraxial portion free from distortion, a high correcting magnification results in a resolution difference between a center of the image surface and a location at which the correcting magnification is high, thereby posing a problem of ununiformity in the image surface. A correcting magnification of 2× or lower does not pose such a problem and is preferable.

Also, it is preferable that distortion has a shape which does not have two or more peaks or valleys on a graph traced taking a focal length of an optical system and maximum distortion as an abscissa and an ordinate respectively.

Figure 15:
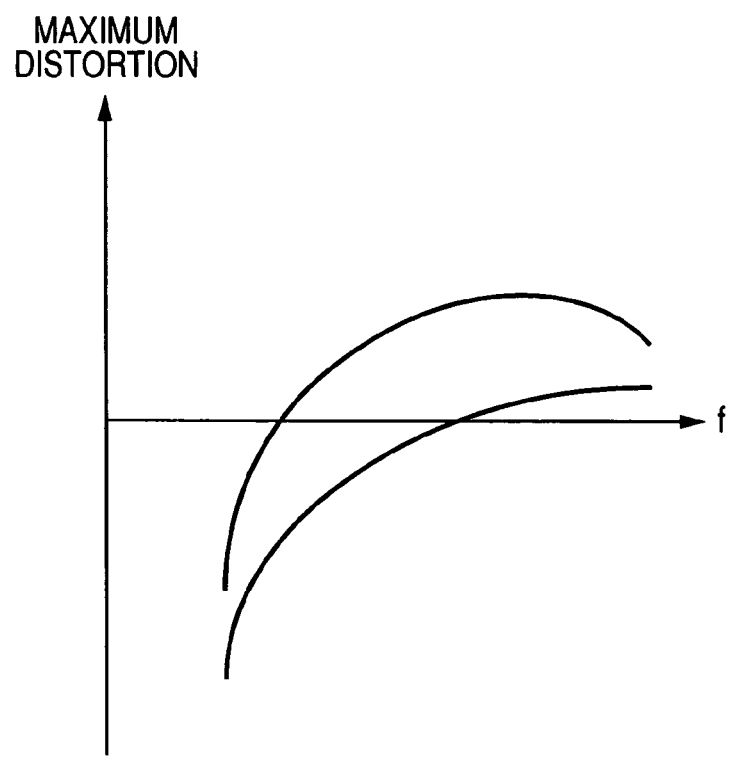
FIG. 15 is a diagram descriptive of a relation between a magnification change and maximum distortion.

In an optical system which allows maximum distortion to be varied by a magnification change as shown in FIG. 15, for example, an amount of image correcting data is increased and an image correcting algorithm is unstable when the mount of the maximum distortion is varied remarkably. Accordingly, an image is apt to be unnatural after correction. It is therefore preferable that graph shown in FIG. 15 is a monotonous chart. It is desirable in particular that the graph shown in FIG. 15 does not have two or more peaks or valleys. Furthermore, it is preferable that distortion at a certain specific focal length has a shape which is not of the so-called helmet type but of a barrel type or a spindle type.

It is preferable for the above described vari-focal optical system has a composition satisfying each of conditions which are described below.

First, the first lens unit of the optical system according to the present invention satisfies the following condition (10):

$$-3 < f1/(fT \times fW)^{1/2} < -0.6 \tag{10}$$

wherein a reference symbol f1 represents a focal length of the first lens unit.

If an upper limit of −0.6 of the condition (10) is exceeded, the first lens unit will have too strong power, aberrations, such as negative distortion, astigmatism and spherical aberration at the wide position in particular will be remarkable. If $f1/(fT \times fW)^{1/2}$ is smaller than a lower limit of −3 of the condition (10), an effective diameter will be large, thereby enlarging the optical system. When the first lens unit is movable, the first lens unit will have a long moving distance, thereby prolonging the total length of the optical system.

When the condition (10) is satisfied, favorable optical performance is compatible with a compact design of the optical system.

It is more preferable to satisfy, in place of the condition (10), the following condition (10-1), which makes it possible to configure the optical system more compact while maintaining favorable optical performance:

$$-2 < f1/(fT \times fW)^{1/2} < -0.8 \tag{10-1}$$

Furthermore, it is much more preferable to satisfy, in place of the condition (10) or (10-1), the following condition (10-2), which makes it possible to configure the optical system much more compact while maintaining the favorable optical performance.

$$-1.3 < f1/(fT \times fW)^{1/2} < -0.9 \tag{10-2}$$

Also, it is preferable that the second lens unit of the optical system to satisfy the following condition (11):

$$0.3 < f2/(fT \times fW)^{1/2} < 2 \tag{11}$$

wherein a reference symbol f2 represents a focal length of the second lens unit.

If an upper limit of 2 of the condition (11) is exceeded, the second positive lens unit will have too weak strong power, thereby making it difficult to correct aberrations such as distortion produced by the first lens unit, negative distortion at the wide position in particular. Furthermore, a light bundle diverged by the first lens unit cannot be sufficiently converged, whereby the optical system will be enlarged. If $f2/(fT \times fW)^{1/2}$ is smaller than a lower limit of 0.3 of the condition (11), in contrast, the second lens unit will have too strong positive power, thereby making it difficult to obtain a telecentric characteristic on the image side. In addition, aberrations will be produced remarkably by the second lens unit.

It is more preferable to satisfy, in place of the condition (11), the following condition (11-1), which makes it possible to configure the optical system more compact while maintaining favorable optical performance.

$$0.4 < f2/(fT \times fW)^{1/2} < 1.5 \tag{11-1}$$

It is much more preferable to satisfy, in place of the condition (11) or (11-1), the following condition (11-2), which makes it possible to configure the optical system much more compact while maintaining the favorable optical performance:

$$0.5 < f2/(fT \times fW)^{1/2} < 1 \tag{11-2}$$

Furthermore, it is preferable for the optical system to satisfy the following condition (12):

$$-5 < f1/f2 < -0.5 \tag{12}$$

If an upper limit of the condition (12) is exceeded, the negative power of the first lens unit will be too strong, thereby increasing distortion, negative distortion at the wide position in particular. Furthermore, the second lens unit will have a long moving distance and the optical system will have a large total length, thereby enlarging the optical system. If f1/f2 is smaller than a lower limit of −5 of the condition (12), the negative power of the first lens unit will be too weak. The optical system will therefore have a large effective diameter and a large design. In addition, it will be difficult to reserve an airspace between the first lens unit and the second lens unit as well as a required magnification at the tele position.

It is preferable to satisfy, in place of the above mentioned condition (12), the following condition (12-1), which makes it possible to configure the optical system more compact while maintaining favorable optical performance.

$$-3<f1/f2<-0.8 \quad (12\text{-}1)$$

It is more preferable for configuring the optical system compact while maintaining the favorable optical performance, to satisfy, in place of the condition (12) or (12-1), the following condition (12-2):

$$-1.8<f1/f2<-1.1 \quad (12\text{-}2)$$

Furthermore, it is desirable to satisfy the following condition (13):

$$0.1<M3/M2<0.9 \quad (13)$$

wherein a reference symbol M2 represents a moving range of the second lens and a reference symbol M3 designates a moving range of the third lens unit.

When the magnification of the optical system is changed from the wide position to the tele position, an airspace between the second lens unit and the third lens unit is gradually widened at low rates in the vicinities of the wide position and high rates in the vicinities of the tele position. As a result, coma and astigmatism which cannot be corrected in the vicinities of the wide position by the second lens unit are corrected by the second lens unit and the third lens unit in the optical system. The above mentioned condition (13) is adopted for correcting the coma and astigmatism.

If an upper limit of 0.9 of the condition (13) is exceeded, the third lens unit will have a large moving range and a weak function for correcting the above mentioned aberrations, thereby making it difficult to maintain optical performance. Furthermore, the second lens unit will have a shorter moving distance, thereby making it difficult to obtain an optical system which has a high vari-focal ratio. If M3/M2 is smaller than a lower limit of 0.1 of the condition (13), on the other hand, the second lens unit will have a large moving range, thereby making it difficult to reserve an airspace between the first lens unit and the second lens unit. It will therefore be obliged to prolong the total length of the optical system. In addition, the location of the exit pupil will be varied more remarkably by the magnification change.

Also, it is preferable to satisfy, in place of the condition (13), the following condition (13-1), which makes it possible to configure the optical system compact while maintaining the favorable optical performance:

$$0.2<M3/M2<0.7 \quad (13\text{-}1)$$

Also, it is more preferable to satisfy, in place of the condition (13) or (13-1), the following condition (13-2), which makes it possible to configure the optical system more compact while maintaining the favorable optical performance.

$$0.3<M3/M2<0.5 \quad (13\text{-}2)$$

Furthermore, it is desirable to satisfy the following condition (14), which makes it possible to configure the optical system compact while maintaining the favorable optical performance:

$$0.3<f2/f4<3 \quad (14)$$

In the optical system, a light bundle which is diverged by the first lens unit having the negative power is converged with a triplet type optical system consisting of the first negative, second positive and third negative lens units. If an upper limit of 3 of the above mentioned condition (14) is exceeded, positive power is weak on the object side in the triplet type optical system, whereby it is necessary to remarkably move the second lens unit toward the first lens unit at the tele position. It is therefore difficult to reserve an airspace between the first lens unit and the second lens unit. Furthermore, the fourth lens unit will have too strong power, thereby producing negative distortion remarkably. If f2/f4 is smaller than a lower limit of 0.3 of the condition (14), the fourth lens unit will have too weak positive power, thereby making it difficult to reserve a required back focal length at the wide position and undercorrecting coma.

It is more preferable to satisfy, in place of the above mentioned condition (14), the following condition (14-1), which makes it possible to realize a zoom optical system which has sufficient imaging performance, a long back focal length and a high vari-focal ratio:

$$0.5<f2/f4<2 \quad (14\text{-}1)$$

Furthermore, it is more preferable to satisfy, in place of the condition (14) or (14-1), the following condition (14-2), which makes it possible to realize a zoom optical system which has more sufficient imaging performance and a high vari-focal ratio.

$$0.6<f2/f4<1 \quad (14\text{-}2)$$

For the vari-focal optical system, it is preferable that the fourth lens unit satisfies the following condition (15):

$$0.4 \leq f4/(fT \times fW)^{1/2} \leq 2 \quad (15)$$

If an upper limit of the condition (15) is exceeded, the most image side lens unit (fourth lens unit) will have too weak power, thereby prolonging the total length of the optical system. Furthermore, the most image side lens nit will produce coma remarkably. Furthermore, it will be difficult to reserve a required focal length and a required back focal length of the optical system as a whole.

Furthermore, when the fourth lens unit of the optical system satisfies the above mentioned condition (15), it is possible to configure the optical system compact while maintaining the optical performance. If $f4/(fT \times fW)^{1/2}$ is smaller than a lower limit of 0.4 of the condition (15), the final lens unit (fourth lens unit) will have too strong power, thereby making it difficult to correct aberrations. For suppressing aberrations to be produced by the most image side lens unit, it is obliged to compose this lens unit of a larger number of lens elements, thereby prolonging the total length of the optical system. Furthermore, the exit pupil is located close to the image surface at the tele position, thereby making it impossible to reserve favorable telecentric characteristic.

It is more preferable to satisfy, in place of the condition (15), the following condition (15-1):

$$0.5 \leq f4/(fT \times fW)^{1/2} \leq 1.8 \quad (15\text{-}1)$$

Furthermore, it is much more desirable to satisfy, in place of the condition (15) or (15-1), the following condition (15-2), which makes it possible to configure the optical system compact while maintaining the favorable optical performance.

$$0.8 \leq f4/(fT \times fW)^{1/2} \leq 1.2 \quad (15\text{-}2)$$

In a case where mainly the fourth lens unit controls the location of the exit pupil for shortening the total length of the optical system, it is unnecessary to compose the fourth lens unit of so large a number of lens elements. It is therefore possible to control the location of the exit pupil with a small number of lens elements when the fourth lens unit is composed of a single positive lens element. In this case, it is preferable for correcting aberrations that the positive lens element is a biconvex lens element.

The vari-focal optical system is intended for use in various kinds of implements having electronic image pickup devices such as a CCD as described above.

An information processing apparatus which uses the optical system has a configuration described below:

Speaking concretely, an information processing apparatus comprises the vari-focal optical system which has any of the above described compositions, an electronic image pickup device disposed at a location for receiving an image of an object formed by the vari-focal optical system, processing means for processing electronic signals subjected to photoelectric conversion by the electronic image pickup device, an input unit used by an operator for inputting desired information signals to the processing means, a display element for displaying outputs from the processing means and a recording medium for recording outputs from the display means, and is configured to allow the processing means to display the image of the object which is formed by the vari-focal optical system and received by the electronic image pickup device on the display element.

Also, the above described information processing apparatus is characterized in that the input unit is composed of a keyboard, and the vari-focal optical system and the electronic image pickup device are built in a circumferential portion of the display element or a circumferential portion of the keyboard.

Also, a telephone apparatus as another implement is characterized by comprising the vari-focal optical system which has any of the above described compositions, an electronic image pickup device disposed at a location for receiving an image of an object formed by the vari-focal optical system, an antenna for transmitting and receiving telephone signals, an input unit for inputting signals such as a telephone number and a signal processing unit for converting the image of the object received by the electronic image pickup device into transmissible signals.

Also, an electronic camera apparatus consists of the vari-focal optical system which has any of the above described compositions, an electronic image pickup device disposed at a location for receiving an image of an object formed by the vari-focal optical system, processing means for processing electronic signals photoelectrically converted by the electronic image pickup device, a display element for making visible the image of the object received by the electronic image pickup device and a recording member for recording image information received by the above described electronic image pickup device which are built or removable disposed in the electronic camera apparatus, and is characterized in that the above described processing means has a display processing mechanism for displaying the image of the object received by the above described electronic image pickup device on the above described display element and a recording processing function for recording the image of the object received by the above described electronic image pickup device on the above described recording member.

Now, description will be made of embodiments of the vari-focal optical system according to the present invention. The embodiments of the vari-focal optical system according to the present invention has lens compositions illustrated in FIG. 1 through FIG. 12 and numeral data which are listed below.

| Embodiment 1 | | | | |
|---|---|---|---|---|
| Surface No. | Radius of curvature | Airspace | Refractive index | Abbe's number |
| Object surface | ∞ | ∞ | | |
| 1 | Aspherical surface [1] | 0.50 | 1.6204 | 60.3 |
| 2 | 3.50 | 0.72 | | |
| 3 | 6.52 | 0.90 | 1.7552 | 27.5 |
| 4 | Aspherical surface [2] | 6.03 | | |
| 5 | Stop surface | 0.00 | | |
| 6 | Aspherical surface [3] | 1.33 | 1.5638 | 60.7 |
| 7 | −10.45 | 0.10 | | |
| 8 | 5.04 | 0.97 | 1.6204 | 60.3 |
| 9 | −6.14 | 0.50 | 1.7400 | 28.3 |
| 10 | Aspherical surface [4] | 0.80 | | |
| 11 | −8.12 | 0.50 | 1.4875 | 70.2 |
| 12 | Aspherical surface [5] | 1.46 | | |
| 13 | 7.26 | 1.45 | 1.6204 | 60.3 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −6.02
k     0
a     $4.1458 \times 10^{-3}$   b   $-2.3179 \times 10^{-4}$   c   $9.7435 \times 10^{-6}$ Aspherical surface [2]

Radius of curvature 47.50
k     0
a     $2.7101 \times 10^{-5}$   b   $-1.0163 \times 10^{-4}$   c   $-5.6436 \times 10^{-6}$ Aspherical surface [3]

Radius of curvature 3.24
k     0
a     $-1.0502 \times 10^{-3}$   b   $-1.4347 \times 10^{-4}$   c   $-2.0548 \times 10^{-5}$ Aspherical surface [4]

Radius of curvature 4.51
k     0
a     $1.0709 \times 10^{-2}$   b   $1.1991 \times 10^{-3}$   c   $5.3274 \times 10^{-4}$ Aspherical surface [5]

Radius of curvature 5.29
k     0
a     $2.0691 \times 10^{-3}$   b   $-1.0907 \times 10^{-3}$   c   $1.0683 \times 10^{-4}$ Aspherical surface [6]

Radius of curvature −6.05
k     0
a     $2.4658 \times 10^{-3}$   b   $-1.4889 \times 10^{-5}$   c   $-1.5349 \times 10^{-7}$

| Zoom data (infinite object point) | | | |
|---|---|---|---|
| | WE | ST | TE |
| f(mm) | 3.33 | 5.55 | 9.25 |
| Fno | 2.80 | 3.72 | 4.90 |
| 2ω(°) | 70.48 | 39.87 | 23.49 |
| d4 | 6.03 | 3.17 | 0.80 |
| d10 | 0.80 | 1.62 | 3.87 |
| d12 | 1.46 | 3.50 | 3.62 |

Embodiment 2

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.5891 | 61.1 |
| 2 | 3.51 | 0.74 | | |
| 3 | 6.94 | 0.92 | 1.7552 | 27.5 |
| 4 | Aspherical surface [2] | 6.10 | | |
| 5 | Stop surface | 0.00 | | |
| 6 | Aspherical surface [3] | 1.17 | 1.6204 | 60.3 |
| 7 | −11.33 | 0.10 | | |
| 8 | 6.85 | 0.93 | 1.6204 | 60.3 |
| 9 | −6.16 | 0.50 | 1.7215 | 29.2 |
| 10 | Aspherical surface [4] | 0.80 | | |
| 11 | −19.73 | 0.50 | 1.4875 | 70.2 |
| 12 | Aspherical surface [5] | 1.76 | | |
| 13 | 8.57 | 1.24 | 1.6385 | 55.4 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −5.21
k 0
a $4.7602 \times 10^{-3}$  b $-2.3258 \times 10^{-4}$  c $1.1012 \times 10^{-5}$

Aspherical surface [2]

Radius of curvature 101.60
k 0
a $-9.8689 \times 10^{-5}$  b $-1.0096 \times 10^{-4}$  c $-3.0657 \times 10^{-6}$

Aspherical surface [3]

Radius of curvature 3.21
k 0
a $-1.6343 \times 10^{-3}$  b $-1.8322 \times 10^{-4}$  c $-2.1419 \times 10^{-5}$

Aspherical surface [4]

Radius of curvature 3.88
k 0
a $1.0861 \times 10^{-2}$  b $1.2415 \times 10^{-3}$  c $4.0454 \times 10^{-4}$

Aspherical surface [5]

Radius of curvature 8.04
k 0
a $1.8531 \times 10^{-3}$  b $-5.2742 \times 10^{-4}$  c $5.4633 \times 10^{-5}$

Aspherical surface [6]

Radius of curvature −7.60
k 0
a $9.5703 \times 10^{-4}$  b $1.8578 \times 10^{-5}$  c $-2.2208 \times 10^{-6}$

Zoom data (infinite object point)

| | WE | ST | TE |
|---|---|---|---|
| f(mm) | 3.33 | 5.54 | 9.19 |
| Fno | 2.80 | 3.74 | 4.90 |
| 2ω(°) | 72.62 | 41.08 | 24.21 |
| d4 | 6.10 | 3.26 | 0.80 |
| d10 | 0.80 | 1.79 | 6.10 |
| d12 | 1.76 | 3.61 | 1.76 |

Embodiment 3

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6031 | 60.6 |
| 2 | 4.48 | 0.97 | | |
| 3 | 7.51 | 0.80 | 1.7552 | 27.5 |
| 4 | Aspherical surface [2] | 5.92 | | |
| 5 | Stop surface | 0.00 | | |
| 6 | Aspherical surface [3] | 1.11 | 1.5831 | 59.4 |
| 7 | −11.90 | 0.18 | | |
| 8 | 5.02 | 1.07 | 1.6031 | 60.6 |
| 9 | −7.11 | 0.50 | 1.7552 | 27.5 |
| 10 | Aspherical surface [4] | 0.99 | | |
| 11 | −5.11 | 0.50 | 1.5163 | 64.1 |
| 12 | Aspherical surface [5] | 1.17 | | |
| 13 | 6.47 | 1.44 | 1.6204 | 60.3 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −4.63
k 0
a $5.5039 \times 10^{-3}$  b $-2.5158 \times 10^{-4}$  c $1.3452 \times 10^{-5}$

Aspherical surface [2]

Radius of curvature 66.64
k 0
a $1.2656 \times 10^{-3}$  b $-9.5692 \times 10^{-5}$  c $7.6969 \times 10^{-6}$

Aspherical surface [3]

Radius of curvature 3.35
k 0
a $-7.3518 \times 10^{-4}$  b $-1.5748 \times 10^{-4}$  c $-1.2254 \times 10^{-5}$

Aspherical surface [4]

Radius of curvature 4.21
k 0
a $1.0627 \times 10^{-2}$  b $1.1853 \times 10^{-3}$  c $4.6230 \times 10^{-4}$

Aspherical surface [5]

Radius of curvature 13.24
k 0
a $3.3734 \times 10^{-4}$  b $-6.6874 \times 10^{-4}$  c $4.2789 \times 10^{-5}$

Aspherical surface [6]

Radius of curvature −6.24
k 0
a $3.3138 \times 10^{-3}$  b $-4.3222 \times 10^{-5}$  c $9.5167 \times 10^{-7}$

Zoom data (infinite object point)

| | WE | ST | TE |
|---|---|---|---|
| f(mm) | 3.33 | 5.40 | 8.73 |
| Fno | 2.80 | 3.73 | 4.85 |
| 2ω(°) | 75.00 | 41.52 | 25.00 |
| d4 | 5.92 | 3.38 | 0.80 |
| d10 | 0.99 | 2.05 | 4.17 |
| d12 | 1.17 | 2.81 | 3.12 |

Embodiment 4

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6204 | 60.3 |
| 2 | 3.25 | 0.29 | | |
| 3 | 4.29 | 0.94 | 1.7552 | 27.5 |
| 4 | Aspherical surface [2] | 5.03 | | |
| 5 | Stop surface | 0.00 | | |
| 6 | Aspherical surface [3] | 1.01 | 1.6204 | 60.3 |
| 7 | −12.57 | 0.10 | | |
| 8 | 4.49 | 0.99 | 1.6204 | 60.3 |
| 9 | −5.35 | 0.50 | 1.7400 | 28.3 |
| 10 | Aspherical surface [4] | 0.56 | | |
| 11 | −11.06 | 0.50 | 1.5174 | 52.4 |
| 12 | Aspherical surface [5] | 1.30 | | |
| 13 | 9.40 | 1.54 | 1.6779 | 50.7 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −5.98
k   0
a   $4.0091 \times 10^{-3}$   b   $-2.7928 \times 10^{-4}$   c   $1.4177 \times 10^{-5}$

Aspherical surface [2]

Radius of curvature 13.18
k   0
a   $3.4011 \times 10^{-4}$   b   $-1.8510 \times 10^{-4}$   c   $-1.2851 \times 10^{-5}$

Aspherical surface [3]

Radius of curvature 3.30
k   0
a   $-5.9142 \times 10^{-4}$   b   $-7.0142 \times 10^{-5}$   c   $-2.5056 \times 10^{-5}$

Aspherical surface [4]

Radius of curvature 4.84
k   0
a   $1.2471 \times 10^{-2}$   b   $1.3152 \times 10^{-3}$   c   $6.8878 \times 10^{-4}$

Aspherical surface [5]

Radius of curvature 3.62
k   0
a   $3.1795 \times 10^{-3}$   b   $-1.5075 \times 10^{-3}$   c   $6.1765 \times 10^{-5}$

Aspherical surface [6]

Radius of curvature −4.42
k   0
a   $3.1479 \times 10^{-3}$   b   $-5.7541 \times 10^{-5}$   c   $8.3945 \times 10^{-6}$

Zoom data (infinite object point)

| | WE | ST | TE |
|---|---|---|---|
| f(mm) | 3.33 | 5.55 | 9.23 |
| Fno | 2.80 | 3.57 | 4.82 |
| 2ω(°) | 69.36 | 38.86 | 23.12 |
| d4 | 5.03 | 2.23 | 0.52 |
| d10 | 0.56 | 1.79 | 3.74 |
| d12 | 1.30 | 1.87 | 2.63 |

Embodiment 5

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.5891 | 61.1 |
| 2 | 3.37 | 0.75 | | |
| 3 | 6.70 | 0.87 | 1.7552 | 27.5 |
| 4 | Aspherical surface [2] | 5.70 | | |
| 5 | Stop surface | 0.00 | | |
| 6 | Aspherical surface [3] | 1.45 | 1.4875 | 70.2 |
| 7 | −9.97 | 0.52 | | |
| 8 | 4.42 | 1.07 | 1.6204 | 60.3 |
| 9 | −5.45 | 0.50 | 1.7282 | 28.5 |
| 10 | Aspherical surface [4] | 0.50 | | |
| 11 | −9.25 | 0.50 | 1.5182 | 58.9 |
| 12 | Aspherical surface [5] | 1.53 | | |
| 13 | 8.28 | 1.37 | 1.6485 | 53.0 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −5.49
k   0
a   $5.0544 \times 10^{-3}$   b   $-3.0410 \times 10^{-4}$   c   $1.3506 \times 10^{-5}$

Aspherical surface [2]

Radius of curvature 46.83
k   0
a   $-3.2227 \times 10^{-5}$   b   $-1.2567 \times 10^{-4}$   c   $-8.9687 \times 10^{-6}$

Aspherical surface [3]

Radius of curvature 3.33
k   0
a   $-1.4380 \times 10^{-3}$   b   $-9.5797 \times 10^{-5}$   c   $-2.0801 \times 10^{-5}$

Aspherical surface [4]

Radius of curvature 6.26
k   0
a   $8.5253 \times 10^{-3}$   b   $7.5797 \times 10^{-4}$   c   $3.8118 \times 10^{-4}$

Aspherical surface [5]

Radius of curvature 4.64
k   0
a   $2.2048 \times 10^{-3}$   b   $-9.9656 \times 10^{-4}$   c   $2.9107 \times 10^{-5}$

Aspherical surface [6]

Radius of curvature −6.31
k   0
a   $2.0807 \times 10^{-3}$   b   $-2.9740 \times 10^{-6}$   c   $1.0497 \times 10^{-6}$

Zoom data (infinite object point)

| | WE | ST | TE |
|---|---|---|---|
| f(mm) | 3.33 | 5.57 | 9.31 |
| Fno | 2.80 | 3.71 | 4.86 |
| 2ω(°) | 70.15 | 39.77 | 23.38 |
| d4 | 5.70 | 2.87 | 0.50 |
| d7 | 0.52 | 0.53 | 0.50 |
| d10 | 0.50 | 1.17 | 3.08 |
| d12 | 1.53 | 3.68 | 4.17 |

Embodiment 6

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6204 | 60.3 |
| 2 | 3.36 | 0.70 | | |
| 3 | 7.90 | 0.50 | 1.4875 | 70.2 |
| 4 | 5.03 | 0.90 | 1.7552 | 27.5 |
| 5 | Aspherical surface [2] | 5.38 | | |
| 6 | Stop surface | 0.00 | | |
| 7 | Aspherical surface [3] | 1.12 | 1.6204 | 60.3 |
| 8 | −10.87 | 0.10 | | |
| 9 | 4.96 | 0.96 | 1.6204 | 60.3 |
| 10 | −5.30 | 0.50 | 1.7400 | 28.3 |
| 11 | Aspherical surface [4] | 0.50 | | |
| 12 | −8.17 | 0.50 | 1.4875 | 70.2 |
| 13 | Aspherical surface [5] | 1.65 | | |
| 14 | 6.79 | 1.46 | 1.6204 | 60.3 |
| 15 | Aspherical surface [6] | 0.10 | | |
| 16 | ∞ | 1.44 | 1.5477 | 62.8 |
| 17 | ∞ | 0.80 | | |
| 18 | ∞ | 0.60 | 1.5163 | 64.1 |
| 19 | ∞ | 0.50 | | |
| Image surface | ∞ | 0.00 | | |

Aspherical surface [1]

Radius of curvature −10.77
k   0
a   $8.2294 \times 10^{-4}$   b   $-2.7934 \times 10^{-5}$   c   $1.7803 \times 10^{-6}$ Aspherical surface [2]

Radius of curvature 15.26
k   0
a   $-1.3734 \times 10^{-3}$   b   $-3.5501 \times 10^{-5}$   c   $-5.6480 \times 10^{-6}$ Aspherical surface [3]

Radius of curvature 3.27
k   0
a   $-8.1868 \times 10^{-4}$   b   $-1.5555 \times 10^{-4}$   c   $-1.9482 \times 10^{-5}$ Aspherical surface [4]

Radius of curvature 4.43
k   0
a   $1.2571 \times 10^{-2}$   b   $1.4464 \times 10^{-3}$   c   $6.7097 \times 10^{-4}$ Aspherical surface [5]

Radius of curvature 4.54
k   0
a   $1.3944 \times 10^{-3}$   b   $-1.1919 \times 10^{-3}$   c   $1.1486 \times 10^{-4}$ Aspherical surface [6]

Radius of curvature −6.24
k   0
a   $2.5630 \times 10^{-3}$   b   $-3.2080 \times 10^{-5}$   c   $6.5654 \times 10^{-7}$ Zoom data (infinite object point)

| | WE | ST | TE |
|---|---|---|---|
| f(mm) | 3.33 | 5.57 | 9.26 |
| Fno | 2.80 | 3.71 | 4.90 |
| 2ω(°) | 70.32 | 39.74 | 23.44 |
| d5 | 5.38 | 2.68 | 0.50 |
| d11 | 0.50 | 1.30 | 3.35 |
| d13 | 1.65 | 3.55 | 3.67 |

Embodiment 7

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6385 | 55.4 |
| 2 | 3.18 | 0.85 | | |
| 3 | 10.06 | 0.98 | 1.7552 | 27.5 |
| 4 | −10.51 | 0.50 | 1.6584 | 50.9 |
| 5 | Aspherical surface [2] | 5.32 | | |
| 6 | Stop surface | 0.00 | | |
| 7 | Aspherical surface [3] | 0.99 | 1.6204 | 60.3 |
| 8 | −10.04 | 0.10 | | |
| 9 | 4.30 | 0.89 | 1.6204 | 60.3 |
| 10 | −7.65 | 0.50 | 1.7552 | 27.5 |
| 11 | Aspherical surface [4] | 0.50 | | |
| 12 | −7.53 | 0.50 | 1.4875 | 70.2 |
| 13 | Aspherical surface [5] | 1.62 | | |
| 14 | 6.54 | 1.50 | 1.6204 | 60.3 |
| 15 | Aspherical surface [6] | 0.10 | | |
| 16 | ∞ | 1.44 | 1.5477 | 62.8 |
| 17 | ∞ | 0.80 | | |
| 18 | ∞ | 0.60 | 1.5163 | 64.1 |
| 19 | ∞ | 0.50 | | |
| Image surface | ∞ | 0.00 | | |

Aspherical surface [1]

Radius of curvature −50.93
k   0
a   $-1.1150 \times 10^{-3}$   b   $4.9798 \times 10^{-5}$   c   $-2.0056 \times 10^{-7}$ Aspherical surface [2]

Radius of curvature 14.65
k   0
a   $-3.3552 \times 10^{-3}$   b   $-1.9526 \times 10^{-5}$   c   $-1.5257 \times 10^{-6}$ Aspherical surface [3]

Radius of curvature 3.22
k   0
a   $-1.0088 \times 10^{-3}$   b   $-2.3761 \times 10^{-4}$   c   $-2.5064 \times 10^{-6}$ Aspherical surface [4]

Radius of curvature 3.58
k   0
a   $1.3851 \times 10^{-2}$   b   $1.8117 \times 10^{-3}$   c   $7.5060 \times 10^{-4}$ Aspherical surface [5]

Radius of curvature 4.52
k   0
a   $1.2216 \times 10^{-3}$   b   $-1.3739 \times 10^{-3}$   c   $1.6669 \times 10^{-4}$ Aspherical surface [6]

Radius of curvature −6.01
k   0
a   $2.8889 \times 10^{-3}$   b   $-2.8165 \times 10^{-5}$   c   $5.2766 \times 10^{-3}$ Zoom data (infinite object point)

| | WE | ST | TE |
|---|---|---|---|
| f(mm) | 3.33 | 5.59 | 9.37 |
| Fno | 2.80 | 3.73 | 4.95 |
| 2ω(°) | 69.09 | 39.23 | 23.03 |
| d5 | 5.32 | 2.64 | 0.50 |
| d11 | 0.50 | 1.35 | 3.53 |
| d13 | 1.62 | 3.44 | 3.42 |

Embodiment 8

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6204 | 60.3 |
| 2 | 3.69 | 0.96 | | |
| 3 | 9.08 | 0.86 | 1.7552 | 27.5 |
| 4 | Aspherical surface [2] | 6.21 | | |
| 5 | Stop surface | 0.00 | | |
| 6 | Aspherical surface [3] | 0.90 | 1.7440 | 44.8 |
| 7 | −55.81 | 0.10 | | |
| 8 | 7.69 | 1.04 | 1.5163 | 64.1 |
| 9 | −3.96 | 0.50 | 1.6398 | 34.5 |
| 10 | 2.09 | 1.07 | 1.6204 | 60.3 |
| 11 | Aspherical surface [4] | 0.50 | | |
| 12 | −10.59 | 0.50 | 1.4875 | 70.2 |
| 13 | Aspherical surface [5] | 1.40 | | |
| 14 | 6.25 | 2.30 | 1.5163 | 64.1 |
| 15 | Aspherical surface [6] | 0.10 | | |
| 16 | ∞ | 1.44 | 1.5477 | 62.8 |
| 17 | ∞ | 0.80 | | |
| 18 | ∞ | 0.60 | 1.5163 | 64.1 |
| 19 | ∞ | 0.50 | | |
| Image surface | ∞ | 0.00 | | |

Aspherical surface [1]

Radius of curvature −5.90
k    0
a    $4.1717 \times 10^{-3}$    b    $-2.2739 \times 10^{-4}$    c    $8.6445 \times 10^{-6}$

Aspherical surface [2]

Radius of curvature −174.73
k    0
a    $1.7087 \times 10^{-4}$    b    $-7.7584 \times 10^{-5}$    c    $-6.5263 \times 10^{-6}$

Aspherical surface [3]

Radius of curvature 4.14
k    0
a    $1.4458 \times 10^{-4}$    b    $4.5153 \times 10^{-5}$    c    $2.7661 \times 10^{-6}$

Aspherical surface [4]

Radius of curvature 29.59
k    0
a    $8.1168 \times 10^{-3}$    b    $5.9611 \times 10^{-4}$    c    $2.7168 \times 10^{-4}$

Aspherical surface [5]

Radius of curvature 4.52
k    0
a    $1.4147 \times 10^{-3}$    b    $-5.5703 \times 10^{-4}$    c    $-6.5721 \times 10^{-6}$

Aspherical surface [6]

Radius of curvature −5.65
k    0
a    $3.0369 \times 10^{-3}$    b    $-6.4153 \times 10^{-5}$    c    $2.9494 \times 10^{-6}$

Zoom data (infinite object point)

| | WE | ST | TE |
|---|---|---|---|
| f(mm) | 3.33 | 5.59 | 9.38 |
| Fno | 2.80 | 3.71 | 4.86 |
| 2ω(°) | 70.60 | 40.14 | 23.53 |
| d4 | 6.21 | 3.13 | 0.57 |
| d11 | 0.50 | 1.26 | 3.35 |
| d13 | 1.40 | 3.72 | 4.19 |

Embodiment 9

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.5891 | 61.1 |
| 2 | 3.47 | 0.59 | | |
| 3 | 5.82 | 0.94 | 1.7552 | 27.5 |
| 4 | Aspherical surface [2] | 6.09 | | |
| 5 | Stop surface | 0.00 | | |
| 6 | Aspherical surface [3] | 0.91 | 1.6204 | 60.3 |
| 7 | −11.20 | 0.23 | | |
| 8 | 4.74 | 0.93 | 1.6204 | 60.3 |
| 9 | −6.12 | 0.50 | 1.7215 | 29.2 |
| 10 | Aspherical surface [4] | 0.50 | | |
| 11 | −3.02 | 0.50 | 1.4875 | 70.2 |
| 12 | −3.58 | 0.10 | | |
| 13 | 5.39 | 0.50 | 1.4875 | 70.2 |
| 14 | Aspherical surface [5] | 1.46 | | |
| 15 | 6.96 | 1.50 | 1.5891 | 61.1 |
| 16 | Aspherical surface [6] | 0.10 | | |
| 17 | ∞ | 1.44 | 1.5477 | 62.8 |
| 18 | ∞ | 0.80 | | |
| 19 | ∞ | 0.60 | 1.5163 | 64.1 |
| 20 | ∞ | 0.50 | | |
| Image surface | ∞ | 0.00 | | |

Aspherical surface [1]

Radius of curvature −5.75
k    0
a    $4.8626 \times 10^{-3}$    b    $-2.5107 \times 10^{-4}$    c    $9.2245 \times 10^{-6}$

Aspherical surface [2]

Radius of curvature 31.33
k    0
a    $3.5638 \times 10^{-4}$    b    $-8.5272 \times 10^{-5}$    c    $-1.1454 \times 10^{-6}$

Aspherical surface [3]

Radius of curvature 3.95
k    0
a    $-2.1138 \times 10^{-4}$    b    $-7.4751 \times 10^{-5}$    c    $-6.3469 \times 10^{-6}$

Aspherical surface [4]

Radius of curvature 4.17
k    0
a    $7.7897 \times 10^{-3}$    b    $7.6306 \times 10^{-4}$    c    $1.8375 \times 10^{-4}$

Aspherical surface [5]

Radius of curvature 2.61
k    0
a    $-3.2368 \times 10^{-3}$    b    $-9.0360 \times 10^{-4}$    c    $-3.8692 \times 10^{-5}$

Aspherical surface [6]

Radius of curvature −6.11
k    0
a    $2.1287 \times 10^{-3}$    b    $-4.2152 \times 10^{-5}$    c    $8.9406 \times 10^{-7}$

Zoom data (infinite object point)

| | WE | ST | TE |
|---|---|---|---|
| f(mm) | 3.33 | 5.59 | 9.37 |
| Fno | 2.80 | 3.73 | 4.93 |
| 2ω(°) | 68.59 | 39.50 | 22.86 |
| d4 | 6.09 | 3.13 | 0.69 |
| d10 | 0.50 | 1.42 | 4.40 |
| d14 | 1.46 | 3.50 | 2.97 |

Embodiment 10

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6204 | 60.3 |
| 2 | 3.31 | 0.55 | | |
| 3 | 4.73 | 1.03 | 1.7552 | 27.5 |
| 4 | Aspherical surface [2] | 5.67 | | |
| 5 | Aspherical surface [3] | 1.23 | 1.6385 | 55.4 |
| 6 | −13.73 | 0.10 | | |
| 7 | 5.32 | 0.88 | 1.6204 | 60.3 |
| 8 | −5.10 | 0.50 | 1.7552 | 27.5 |
| 9 | Stop surface | 0.80 | | |
| 10 | −8.31 | 0.50 | 1.4875 | 70.2 |
| 11 | Aspherical surface [4] | 1.98 | | |
| 12 | 6.81 | 1.52 | 1.6204 | 60.3 |
| 13 | Aspherical surface [6] | 0.10 | | |
| 14 | ∞ | 1.44 | 1.5477 | 62.8 |
| 15 | ∞ | 0.80 | | |
| 16 | ∞ | 0.60 | 1.5163 | 64.1 |
| 17 | ∞ | 0.50 | | |
| Image surface | ∞ | 0.00 | | |

Aspherical surface [1]

Radius of curvature −5.52
k  0
a  $5.4968 \times 10^{-3}$  b  $-3.3870 \times 10^{-4}$  c  $1.5307 \times 10^{-5}$ Aspherical surface [2]

Radius of curvature 15.80
k  0
a  $1.2697 \times 10^{-3}$  b  $-2.0004 \times 10^{-4}$  c  $2.5137 \times 10^{-6}$ Aspherical surface [3]

Radius of curvature 3.44
k  0
a  $1.0381 \times 10^{-4}$  b  $-6.4560 \times 10^{-5}$  c  $1.4365 \times 10^{-5}$ Aspherical surface [4]

Radius of curvature 5.60
k  0
a  $1.0541 \times 10^{-2}$  b  $1.3968 \times 10^{-3}$  c  $3.5661 \times 10^{-4}$ Aspherical surface [5]

Radius of curvature 4.56
k  0
a  $1.4586 \times 10^{-3}$  b  $-1.7750 \times 10^{-3}$  c  $2.8864 \times 10^{-4}$ Aspherical surface [6]

Radius of curvature −5.34
k  0
a  $3.5622 \times 10^{-3}$  b  $-1.5564 \times 10^{-5}$  c  $-5.8621 \times 10^{-7}$ Zoom data (infinite object point)

| | WE | ST | TE |
|---|---|---|---|
| f(mm) | 3.33 | 5.50 | 9.11 |
| Fno | 2.80 | 3.85 | 5.31 |
| 2ω(°) | 70.08 | 39.57 | 23.36 |
| d4 | 5.67 | 2.98 | 0.80 |
| d9 | 0.80 | 1.80 | 4.27 |
| d11 | 1.98 | 3.67 | 3.39 |

Embodiment 11

| Surface No. | Radius of curvature | Airspace | Refractive index | Abbe's number |
|---|---|---|---|---|
| Object surface | ∞ | ∞ | | |
| 1 | Aspherical surface [1] | 0.50 | 1.6204 | 60.3 |
| 2 | 2.98 | 0.88 | | |
| 3 | 5.23 | 0.88 | 1.7552 | 27.5 |
| 4 | Aspherical surface [2] | 6.53 | | |
| 5 | Stop surface | 0.00 | | |
| 6 | Aspherical surface [3] | 1.02 | 1.6385 | 55.4 |
| 7 | −17.17 | 0.10 | | |
| 8 | 7.32 | 0.79 | 1.6204 | 60.3 |
| 9 | −5.90 | 0.50 | 1.7400 | 28.3 |
| 10 | Aspherical surface [4] | 0.80 | | |
| 11 | −28.77 | 0.50 | 1.4875 | 70.2 |
| 12 | Aspherical surface [5] | 1.62 | | |
| 13 | 8.95 | 1.45 | 1.6204 | 60.3 |
| 14 | Aspherical surface [6] | 0.10 | | |
| 15 | ∞ | 1.44 | 1.5477 | 62.8 |
| 16 | ∞ | 0.80 | | |
| 17 | ∞ | 0.60 | 1.5163 | 64.1 |
| 18 | ∞ | 0.50 | | |
| Image surface | ∞ | 0.00 | | |

Aspherical surface [1]

Radius of curvature −11.89
k  0
a  $3.3530 \times 10^{-3}$  b  $-1.3909 \times 10^{-4}$  c  $2.9292 \times 10^{-6}$ Aspherical surface [2]

Radius of curvature 13.77
k  0
a  $-3.7319 \times 10^{-4}$  b  $-2.0287 \times 10^{-5}$  c  $-2.9914 \times 10^{-5}$ Aspherical surface [3]

Radius of curvature 2.79
k  0
a  $-1.0997 \times 10^{-3}$  b  $-6.8993 \times 10^{-5}$  c  $-7.0612 \times 10^{-5}$ Aspherical surface [4]

Radius of curvature 3.90
k  0
a  $1.6914 \times 10^{-2}$  b  $2.3905 \times 10^{-3}$  c  $1.5240 \times 10^{-3}$ Aspherical surface [5]

Radius of curvature 4.65
k  0
a  $4.4861 \times 10^{-3}$  b  $-2.0142 \times 10^{-3}$  c  $2.9670 \times 10^{-4}$ Aspherical surface [6]

Radius of curvature −5.55
k  0
a  $1.4744 \times 10^{-3}$  b  $9.6921 \times 10^{-5}$  c  $-6.2413 \times 10^{-6}$ Zoom data (infinite object point)

| | WE | ST | TE |
|---|---|---|---|
| f(mm) | 3.33 | 5.77 | 10.00 |
| Fno | 2.80 | 3.84 | 5.20 |
| 2ω(°) | 64.58 | 37.99 | 21.70 |
| d4 | 6.53 | 3.40 | 0.80 |
| d10 | 0.80 | 1.74 | 4.98 |
| d12 | 1.62 | 3.82 | 3.17 |

| Embodiment 12 | | | | |
|---|---|---|---|---|
| Surface No. | Radius of curvature | Airspace | Refractive index | Abbe's number |
| Object surface | ∞ | ∞ | | |
| 1 | Aspherical surface [1] | 0.60 | 1.6779 | 55.3 |
| 2 | 4.30 | 1.04 | 1.6889 | 31.1 |
| 3 | 28.66 | 5.55 | | |
| 4 | Stop surface | 0.15 | | |
| 5 | Aspherical surface [2] | 0.63 | 1.4970 | 81.5 |
| 6 | −8.12 | 0.10 | | |
| 7 | Aspherical surface [3] | 1.42 | 1.7433 | 49.3 |
| 8 | −6.33 | 0.69 | 1.6889 | 31.1 |
| 9 | Aspherical surface [4] | 0.51 | | |
| 10 | −136.31 | 0.92 | 1.7308 | 40.5 |
| 11 | Aspherical surface [5] | 2.98 | | |
| 12 | 10.28 | 1.50 | 1.8061 | 40.9 |
| 13 | Aspherical surface [6] | 1.00 | | |
| 14 | ∞ | 0.50 | 1.5163 | 64.1 |
| 15 | ∞ | 0.70 | | |
| Image surface | ∞ | 0.00 | | |

Aspherical surface [1]

Radius of curvature −7.26
k    −7.5008 × $10^{-1}$
a    2.8206 × $10^{-5}$    b    1.5091 × $10^{-5}$    c    −2.3234 × $10^{-6}$ Aspherical surface [2]

Radius of curvature 12.14
k    −1.0772 × 10
a    1.1765 × $10^{-4}$    b    2.0616 × $10^{-4}$    c    2.1972 × $10^{-5}$ Aspherical surface [3]

Radius of curvature 3.37
k    −5.3133 × $10^{-1}$
a    3.2799 × $10^{-3}$    b    −4.8597 × $10^{-5}$    c    2.9707 × $10^{-5}$ Aspherical surface [4]

Radius of curvature 3.35
k    −1.4967e
a    1.5684 × $10^{-2}$    b    6.4902 × $10^{-4}$    c    4.4655 × $10^{-4}$ Aspherical surface [5]

Radius of curvature 9.53
k    −1.7189 × 10
a    2.4182 × $10^{-3}$    b    −2.2193 × $10^{-4}$ Aspherical surface [6]

Radius of curvature −12.70
k    −5.7080 × 10
a    −1.3200 × $10^{-3}$    b    3.4540 × $10^{-5}$    c    7.9575 × $10^{-8}$ Zoom data (infinite object point)

| | WE | ST | TE |
|---|---|---|---|
| f(mm) | 4.79 | 7.72 | 13.06 |
| Fno | 2.40 | 3.15 | 4.29 |
| 2ω(°) | 64.51 | 36.60 | 21.16 |
| d3 | 5.55 | 2.79 | 0.15 |
| d9 | 0.51 | 0.80 | 3.39 |
| d11 | 2.98 | 5.45 | 5.49 |

| | Embodiment 1 | Embodiment 2 | Embodiment 3 |
|---|---|---|---|
| Condition (1) | −0.630 | −0.630 | −0.686 |
| Condition (2) | 1.786 | 1.776 | 2.064 |
| Condition (3) | −6.023 | −5.206 | −4.632 |
| Condition (4) | 0.819 | 0.752 | 0.854 |
| Condition (5) | 0.831 | 0.971 | 0.935 |

-continued

| | Embodiment 1 | Embodiment 2 | Embodiment 3 |
|---|---|---|---|
| Condition (6) | −0.620 | −0.584 | −0.637 |
| Condition (7) | −0.233 | −0.538 | −0.321 |
| Condition (8) | −1.170 | −2.104 | −1.312 |
| Condition (9) | −3.6277 | −2.036 | −3.211 |
| Condition (10) | −1.103 | −1.122 | −1.198 |
| Condition (11) | 0.820 | 0.904 | 0.893 |
| Condition (12) | −1.345 | −1.241 | −1.342 |
| Condition (13) | 0.465 | 0.349 | 0.406 |
| Condition (14) | 0.820 | 0.770 | 0.900 |
| Condition (15) | 1.000 | 1.175 | 0.992 |

| | Embodiment 4 | Embodiment 5 | Embodiment 6 |
|---|---|---|---|
| Condition (1) | −0.599 | −0.623 | −0.732 |
| Condition (2) | 1.452 | 1.840 | 2.635 |
| Condition (3) | −5.977 | −5.488 | −10.770 |
| Condition (4) | 0.779 | | 0.752 |
| Condition (5) | 0.738 | | 0.771 |
| Condition (6) | −0.607 | | −0.575 |
| Condition (7) | −0.095 | 0.117 | −0.252 |
| Condition (8) | −0.940 | −1.058 | −1.064 |
| Condition (9) | −3.691 | −4.037 | −3.938 |
| Condition (10) | −1.053 | −1.066 | −1.057 |
| Condition (11) | 0.716 | 0.788 | 0.752 |
| Condition (12) | −1.470 | −1.354 | −1.406 |
| Condition (13) | 0.294 | 0.515 | 0.463 |
| Condition (14) | 0.856 | 0.765 | 0.763 |
| Condition (15) | 0.837 | 1.029 | 0.985 |

| | Embodiment 7 | Embodiment 8 | Embodiment 9 |
|---|---|---|---|
| Condition (1) | −0.835 | −0.642 | −0.644 |
| Condition (2) | 4.282 | 2.048 | 1.665 |
| Condition (3) | −50.926 | −5.896 | −5.752 |
| Condition (4) | 0.723 | 0.933 | 0.862 |
| Condition (5) | 0.817 | | 0.796 |
| Condition (6) | −0.566 | | −0.603 |
| Condition (7) | −0.328 | 0.052 | −0.215 |
| Condition (8) | −1.023 | −1.149 | −1.557 |
| Condition (9) | −4.020 | −4.062 | −2.798 |
| Condition (10) | −1.042 | −1.087 | −1.171 |
| Condition (11) | 0.736 | 0.841 | 0.862 |
| Condition (12) | −1.417 | −1.292 | −1.358 |
| Condition (13) | 0.439 | 0.510 | 0.415 |
| Condition (14) | 0.777 | 0.770 | 0.836 |
| Condition (15) | 0.946 | 1.092 | 1.032 |

| | Embodiment 10 | Embodiment 11 | Embodiment 12 |
|---|---|---|---|
| Condition (1) | −0.592 | −0.656 | −0.492 |
| Condition (2) | 1.558 | 1.854 | 0.906 |
| Condition (3) | −5.522 | −11.892 | −7.265 |
| Condition (4) | 0.804 | 0.665 | 1.247 |
| Condition (5) | 0.787 | 0.934 | 0.397 |
| Condition (6) | −0.629 | −0.538 | −0.388 |
| Condition (7) | −0.171 | −0.653 | 0.618 |
| Condition (8) | −1.082 | −1.415 | −1.529 |
| Condition (9) | −3.852 | −2.880 | −2.353 |
| Condition (10) | −1.039 | −1.120 | −1.082 |
| Condition (11) | 0.794 | 0.834 | 0.625 |
| Condition (12) | −1.308 | −1.342 | −1.730 |
| Condition (13) | 0.388 | 0.420 | 0.465 |

-continued

|  | Embodiment 10 | Embodiment 11 | Embodiment 12 |
|---|---|---|---|
| Condition (14) | 0.864 | 0.839 | 0.685 |
| Condition (15) | 0.919 | 0.994 | 0.913 |

In the numerical data listed above, the surface Nos. 1, 2, . . . represent first, second, . . . surfaces as numbered in order from the object side. Furthermore, the radii of curvature designate radii of curvature on the respective surfaces having the surface numbers in a unit of millimeter. Furthermore, the aspherical surfaces [1], . . . in a column of radius of curvature are specified for each embodiment. Furthermore, airspaces are specified sequentially as an airspace between the first lens unit and the second lens unit on a line of surface No. 1 and an airspace between the second lens unit and the third lens unit on a line of surface No. 2. The airspaces are similarly specified in the unit of millimeter. Refractive indices and Abbe's numbers are similarly specified as those of a material between the first surface and the second surface on the line of surface No. 1. In addition, reference symbols WE, ST and TE represent the wide position, an intermediate focal length (standard) and the tele position respectively. The numerical data are listed similarly on lines of the other surface numbers.

Furthermore, reference symbols k, a, b, c, . . . in the aspherical surfaces represent values of aspherical surface coefficients used in a formula of an aspherical surface described later.

The first embodiment of the vari-focal optical system according to the present invention has a composition illustrated in FIG. 1.

As shown in FIG. 1, the optical system according to the first embodiment consists of four lens units; in order from the object side, a first negative lens unit G1, a second positive lens unit G2, a third negative lens unit G3 and a fourth positive lens unit G4. In this optical system, an aperture stop S is disposed on the object side of the second lens unit and a triplet type optical system is composed of the positive, negative and positive lens units on the image side of the aperture stop.

For changing a magnification of the optical system from a wide position to a tele position, the first lens unit G1 is kept stationary, whereas the aperture stop S is moved together with the second lens unit G2 on the object side and the third lens unit G3 is moved on the object side while widening the airspace between the second lens unit G2 and the third lens unit G3. In addition, the fourth lens unit is kept stationary.

Furthermore, disposed on a side of an image surface I of the fourth lens unit G4 are filters F which are also kept stationary during the magnification change.

The optical system according to the first embodiment which moves the second lens unit G2 together with the aperture stop S reduces variations of aberrations to be caused by the magnification change and prevents an effective diameter from being enlarged.

Furthermore, the second lens unit G2 is movable for changing the magnification and therefore mainly has a vari-focal function. The third lens unit G3 is movable for changing the magnification and mainly has a function to correct a variation of an image location.

Furthermore, the optical system according to the first embodiment performs focusing by moving the third lens unit G3 toward an image pickup surface when an object point approaches the optical system from an infinite distance.

This optical system which sues the first lens unit G1 having negative refractive power forms an image point of the first lens unit G1 (an object point of the second lens unit G2) at a location rather far from the second lens unit G2 on the object side. For shortening a total length of the optical system, it is necessary to narrow an airspace between the first lens unit and the second lens unit and a total focal length of the second lens unit G2 and the third lens unit G3. For reserving moving ranges for the second lens unit G2 and the third lens unit G3 for the magnification change, on the other hand, it is necessary to reserve a certain degree of airspace between the first lens unit G1 and the second lens unit G2. As a result, it is difficult to obtain compatibility between the shortening of the total length of the optical system and the reservation of a required vari-focal ratio.

When the third lens unit actually has positive refractive power, it is difficult to obtain compatibility between the shortening of the total length of the optical system and maintenance of favorable optical performance. When the third lens unit has negative refractive power, however, a principal point of a composite system of the second lens unit and the third lens unit is located on the object side of the second lens unit, thereby making it possible to narrow an interval between principal points of a composite system of the first lens unit, the second lens unit and the third lens unit. Furthermore, it is possible to shorten focal lengths of the second lens unit and the third lens unit. Accordingly, it is possible to enhance a magnification of the second lens unit and shorten a moving distance of the second lens unit.

As a result, it is possible to shorten the total length of the optical system, reserve the airspace for the magnification change and obtain a high vari-focal ratio.

Furthermore, the second lens unit G2 must converge rays diverged by the first lens unit G1 which has the negative power. For this reason, the second lens unit G2 of the optical system according to the first embodiment is configured to comprise two lens elements having positive power to have a short focal length while securing favorable optical performance.

Furthermore, the second lens unit G2 is moved in a direction of an optical axis for changing the magnification from the wide position to the tele position. It is therefore necessary to suppress variations of aberrations including chromatic aberration to be caused by the magnification change. For suppressing the variations, the second lens unit must comprise at least a lens element having negative power. When the second lens unit consists of three lens elements, it is preferable for correction aberrations to compose the second lens unit of positive, positive and negative lens elements in order from the object side. In the first embodiment, the second lens unit therefore consists of three lens elements; a positive lens element, and a cemented lens component consisting of a positive lens element and a negative lens element. Furthermore, when a final surface of the second lens unit is configured as a surface concave on the image side, a principal point of the second lens unit is shifted in a side of the first lens unit G1, thereby making it possible to narrow an interval between principal points of the second lens unit G2 and shorten the total length of the optical system. Furthermore, a magnification of the second lens unit can be enhanced, thereby shortening a distance for which the second lens unit is moved by the magnification change.

In the optical system according to the first embodiment of the present invention, six aspherical surfaces are used as a most image side surface of the first lens unit G1, a most object side surface of the second lens unit G2, a most image side surface of the second lens unit G2, an image side surface of the third lens unit G3 and an image side surface of the fourth lens unit G4.

Spherical aberration can be effectively corrected when an aspherical surface is used as the most object side surface of the second lens unit G2. This aspherical surface is a surface which has an aspherical surface function to weaken paraxial power as portions of the aspherical surface are farther from the optical axis. The aspherical surface can therefore suppress positive spherical aberration produced in the second lens unit.

Furthermore, when an aspherical surface is used as the most image side surface of the second lens unit G2, offaxial aberrations such as astigmatism, and coma can be corrected effectively. Since the most image side surface of the second lens unit G2 is apt to produce aberrations of high orders, the aspherical surface used as the most image side surface of the second lens unit can suppress production of the aberrations of the high orders. Furthermore, the aspherical surfaces which are used as the most object side surface and the most image side surface of the second lens unit G2 remarkably increase aberration correcting amounts, and can prevent spherical aberration produced in the second lens unit G2 from being varied by the magnification change and correct astigmatism and the like produced in the second lens unit.

Furthermore, since the lens element having positive power and the lens element having negative power have a shape close to that of a cemented lens component, thereby reducing performance degradation to be caused by cementing, and further shortening moving distances of the second lens unit and the third lens unit, and further shorten distances for which the second lens unit G2 and the third lens unit G3 are moved due to the magnification change.

Furthermore, the aspherical surface used as the most object side surface has a function to cancel all aberrations (spherical aberration, coma, astigmatism and distortion) produced due to an aspherical surface effect of the most image side surface of the second lens unit G2. When both the above described surfaces of the second lens unit are configured as the aspherical surfaces, it is possible to effectively suppress all the aberrations produced in the second lens unit G2. In addition, an object side surface of the fourth lens unit G4 may be configured as an aspherical surface.

The first embodiment has a vari-focal ratio (a focal length at the tele position/a focal length at the wide position) of 2.8. However, the optical system has a high vari-focal ratio of 3 between a field angle at the wide position and the tele position enhanced by producing negative distortion at the wide position and electrically correct image distortion. That is, the optical system according to the first embodiment has a magnification of 3× on an actual image surface including distortion though the optical system has a paraxial magnification of 2.8×. In this case, since the negative power of the first lens unit G1 and total positive power of the second and subsequent lens units compose a retrofocus type optical system, which can easily produce negative distortion at the wide position. Accordingly, it is easy to configure the first embodiment so as to have a wide field angle and a high vari-focal ratio.

It is preferable for shortening the total length of the optical system to satisfy a condition of a minimum central thickness of the lens system ≦ a maximum image height×0.5. Furthermore, it is preferable that each lens element satisfies a condition of a minimum marginal thickness of at an effective diameter ≦ the maximum image height×0.5. Moreover, it is preferable for shortening the total length of the optical system to satisfy a condition of a minimum airspace before or after the moving lens unit ≦ the maximum image height×0.6.

When aspherical surfaces such as those described are to be disposed, it is desirable that the lens unit to have the aspherical surfaces are made of a glass material and a transition point of the glass material Tg satisfies the following condition:

$60° C. < Tg < 620° C.$

Polishing cannot form an aspherical surface in a precise shape. Furthermore, grinding cannot work aspherical surfaces in a large amount. When a material of lens elements satisfies the above mentioned condition a glass molding method permits working the lens elements, thereby easily allowing mass production. It is preferable to work lens elements having aspherical surfaces by the glass molding method. Furthermore, the lens elements having aspherical surfaces can be made of organic and inorganic hybrid materials. These organic and inorganic hybrid materials are classified, as disclosed by Japanese Patent Kokai Publication No. Hei 7-90181, into inorganic materials in which organic materials are dispersed and organic materials in which inorganic materials are dispersed. These organic and inorganic hybrid materials have melt points lower than that of glass, easily permits mass production of lens element by molding at low temperatures and lowers manufacturing costs of optical systems. Furthermore, the hybrid materials provide lens elements having optical characteristics of refractive indices and dispersing power which are higher and lower than those of plastic lens elements. The lens elements which are made of the hybrid materials is excellent in heat resistance, hardly insurable and usable as front lens elements of optical systems. It is preferable to use lens elements made of such organic or inorganic materials for the lens units having the aspherical surfaces.

Furthermore, aspherical lens elements may be made of plastic materials. Plastic aspherical lens elements can be manufactured easily and in a large amounts by a plastic molding method. Furthermore, plastic materials which are available at low costs scan provide inexpensive lens elements and optical systems. In addition, plastic lens elements which are higher than glass lens elements make it possible to reduce weights of optical systems.

Furthermore, it is possible to adopt plastic lens elements as all lens elements of the optical system according to the present invention. When plastic elements are adopted as all the lens elements of the optical system, all the lens elements can be manufactured by the plastic molding method, thereby allowing mass production of the optical system. Moreover, the plastic lens elements which require a low material cost makes it possible to obtain an inexpensive optical system.

Figure 2:
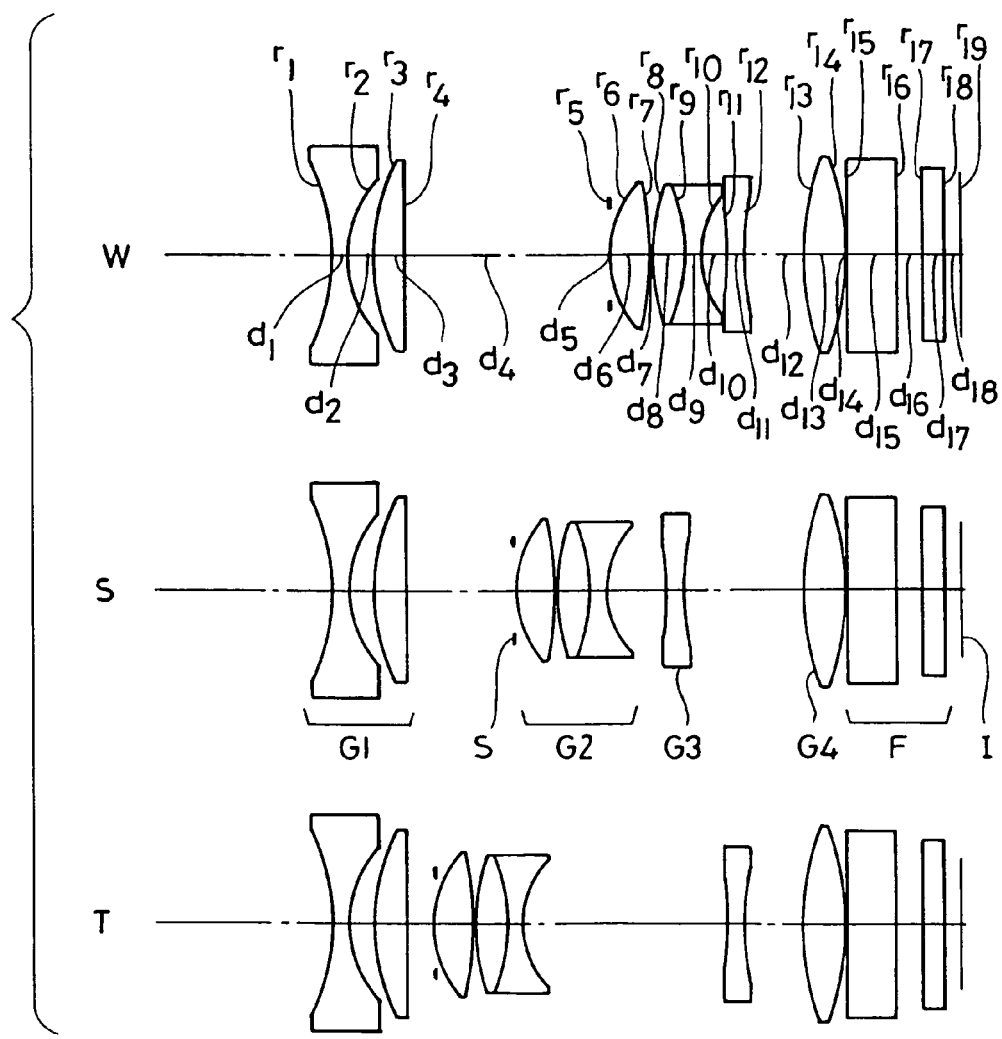
FIG. 2 is a sectional view illustrating a composition of the second embodiment of the present invention.

Next, the second embodiment of the vari-focal optical system according to the present invention has a composition illustrated in FIG. 2. Like the first embodiment, the second embodiment consists of four negative, positive, negative and positive lens units, and moves a second lens unit G2 and a third lens unit G3 along an optical axis for changing a magnification from the wide position to a tele position. Speaking more concretely, the magnification change from the wide position to the tele position is performed by keeping a first negative lens unit G1 stationary, moving a second positive lens unit G2 together with an aperture stop S on the object side, moving the third negative lens unit G3 on the object side while widening an airspace between the second lens unit G2 and the third lens unit G3 and then on the image side, and keeping a fourth positive lens unit G4 and filters stationary relative to an image surface.

The second embodiment has a ratio of 2.8 between a focal length at the tele position and a focal length at the wide position, but allows a ratio between a field angle at the wide position and a field angle at the tele position to be enhanced to 3 by producing negative distortion at the wide position and electrically correct image distortion.

The second embodiment may be used only at the wide position and the tele position by moving only the second lens unit G2 while keeping the third lens unit G2 at a location for the wide position and the tele position. When the second embodiment is to be used as described above, a number of the moving lens units is reduced and a mechanism is simplified, whereby the second embodiment can be configured more compact.

When the second embodiment is to be used only at the wide position and the tele position, a moving lens unit may be manually switched to the position for the wide position and the tele position. In this case, an actuator is preferably unnecessary.

Figure 3:
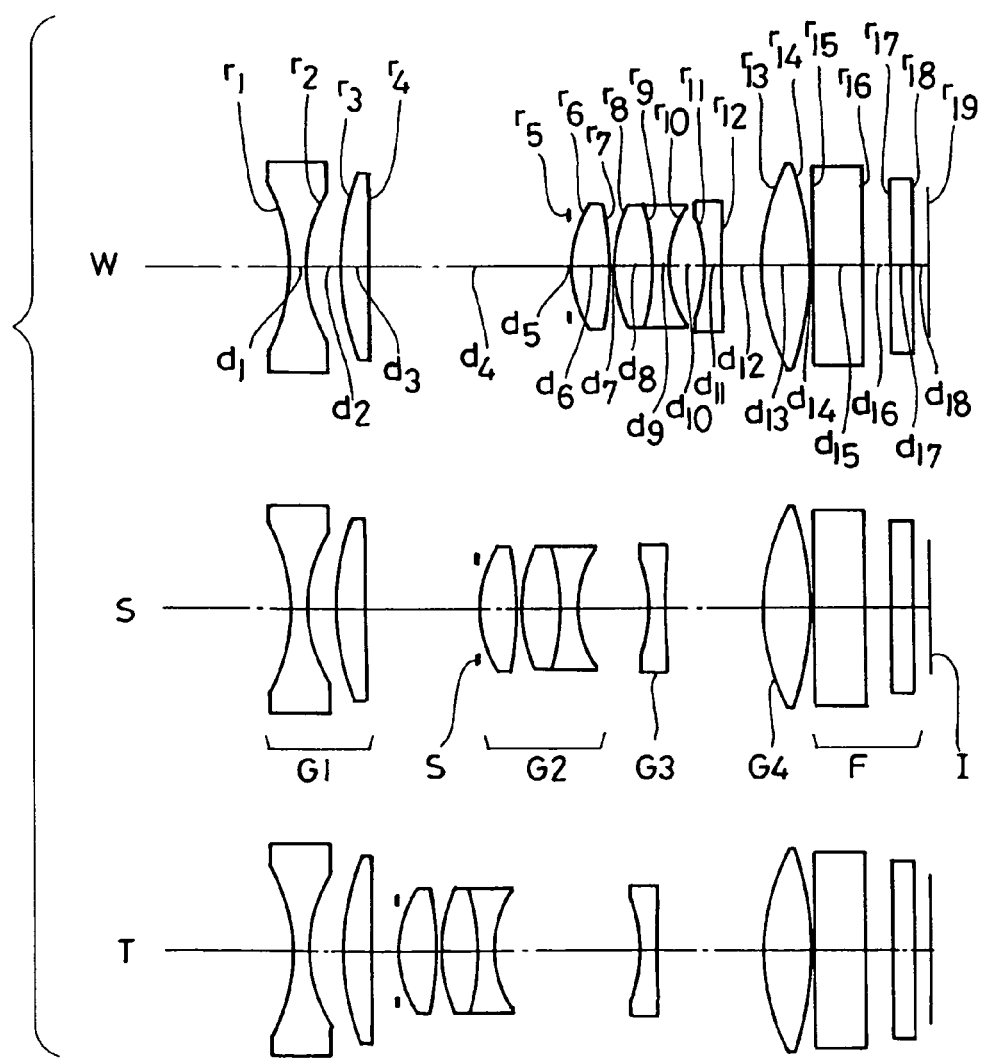
FIG. 3 is a sectional view illustrating a composition of the third embodiment of the present invention.
Figure 4:
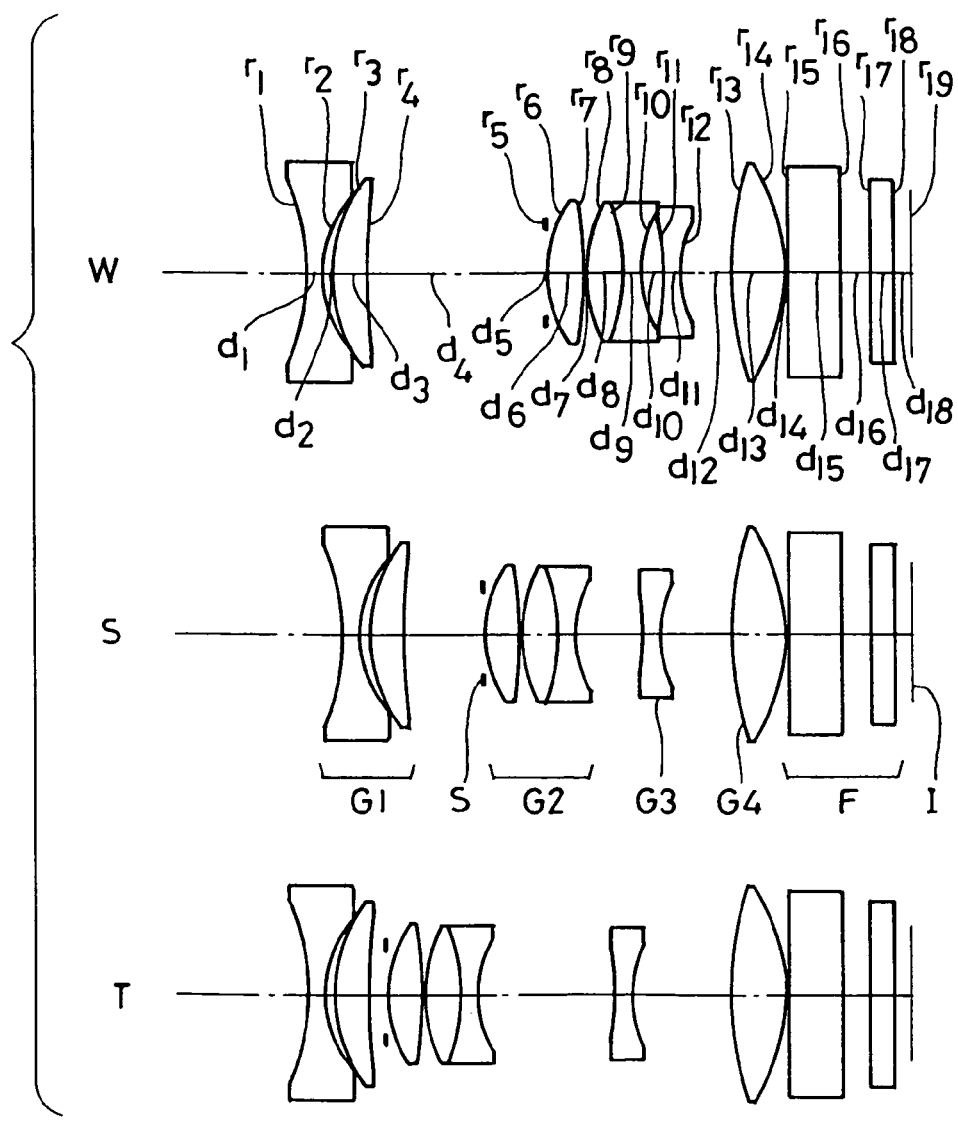
FIG. 4 is a sectional view illustrating a composition of the fourth embodiment of the present invention.

A vari-focal optical system according to the second embodiment of the present invention has a composition illustrated in FIG. 3. Like the first embodiment, the third embodiment consists of four negative, positive, negative and positive lens units. For changing a magnification from a wide position to a tele position, a first negative lens unit G1 is kept stationary, a second positive lens unit G2 is moved on the object side together with an aperture stop S, a third negative lens unit G3 is moved on the object side while widening an airspace between the second lens unit G2 and the third lens unit G3 and then returned on the image side, and a fourth lens unit G4 is kept stationary together with filters F.

The optical system according to the third embodiment has a ratio 2.6 between a focal length at the tele position and a focal length at the wide position. For the third embodiment, however, it is possible to enhance a ratio between a field angle at the wide position and a field angle at the tele position to 3 and electrically correct image distortion.

The third embodiment is focused by moving the lens component on disposed on the image side in the first lens unit.

Furthermore, a vari-focal optical system according to the fourth embodiment of the present invention is an example in which a first G1 lens unit is movable for changing a magnification.

Speaking concretely, the optical system according to the fourth embodiment consists of four lens units: a first negative lens unit G1, a second positive lens unit G2, a third lens unit G3 and a fourth positive lens unit G4. For changing a magnification from a wide position to a tele position, the first lens unit G1 is moved on the image side and then in a direction to return on the object side, the second lens unit G2 is moved on the object side together with an aperture stop S, the third lens unit G3 is moved on the object side while widening an airspace between the second lens unit G2 and the third lens unit, and the fourth lens unit G4 is kept stationary together with filters F relative to an image surface.

Though the optical system according to the fourth embodiment has a ratio between a focal length at the tele position and a focal length at the wide position of 2.8, the optical system has a high vari-focal ratio of 3 between a field angle at the wide position and a field angle at the tele position by producing negative distortion on a side of the wide position.

In the optical system according to the present invention, the first lens unit G1 and the fourth lens unit G4 are disposed at locations apart from the stop S. Such an optical system is preferable since the optical system can lessen a burden on an actuator when lens element are configured so as to have not a circular external shape but a rectangular external shape and reduce weights of lens units.

Figure 5:
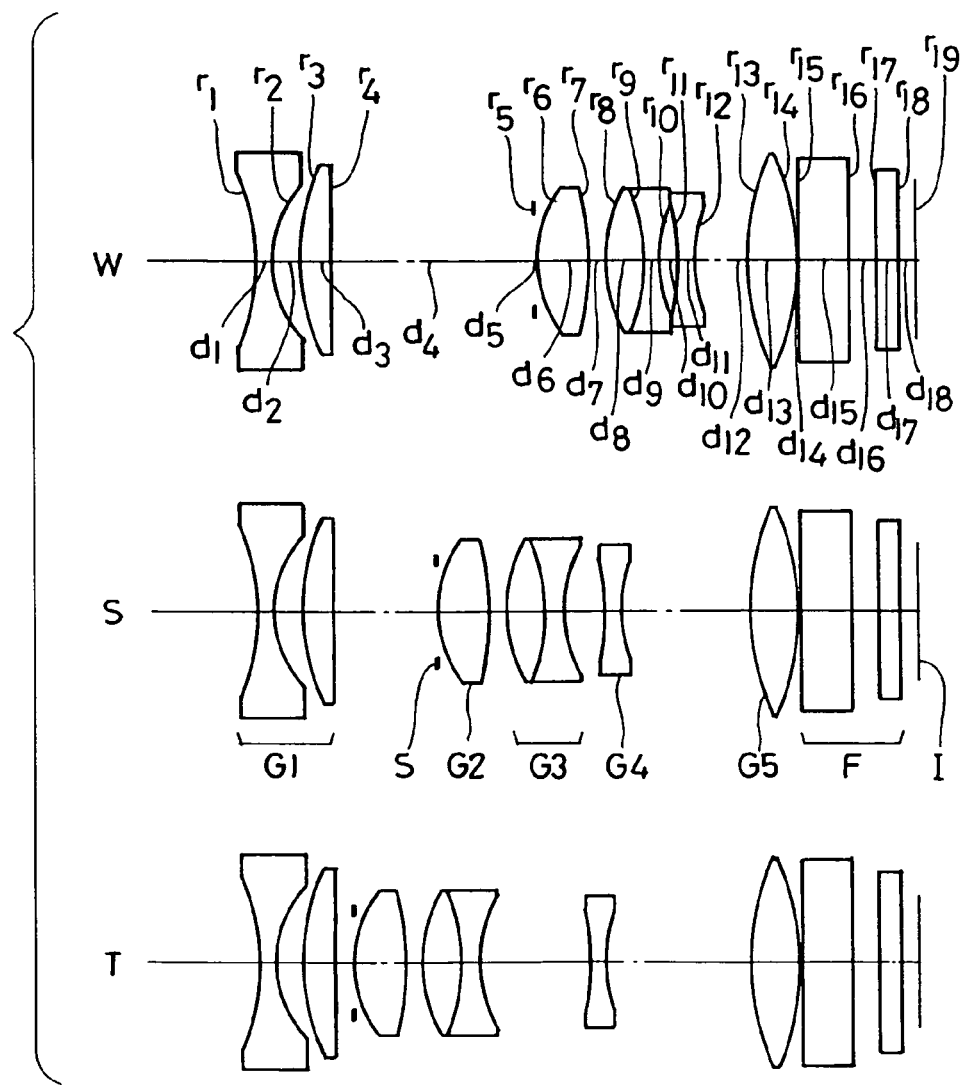
FIG. 5 is a sectional view illustrating a composition of the fifth embodiment of the present invention.

A vari-focal optical system according to the fifth embodiment of the present invention has a composition illustrated in FIG. 5. In the fifth embodiment, the second lens unit G2 in each of the first through fourth embodiments is divided into a second lens unit G2 consisting of a biconvex lens component and a third lens unit G3 consisting of a cemented lens component. Speaking more concretely, the optical system according to the fifth embodiment consists of a first negative lens unit G1, a second positive lens unit G2, a third positive lens unit G3, a fourth negative lens unit G4 and a fifth positive lens unit G5. For changing a magnification from a wide position to a tele position, the first lens unit G1 is kept stationary, the second lens unit G2 is moved on the object side together with an aperture stop S, the third lens unit G3 is moved on the object side while widening and then narrowing an airspace between the second lens unit G2 and the third lens unit G3, the fourth lens unit G4 is moved on the object side while widening an airspace between the third lens unit G3 and the fourth lens unit G4 and then on the image side, and the fifth lens unit G5 is kept stationary together with filters F.

Though the optical system according to the fifth embodiment has a ratio of 2.8 between a focal length at the tele position and a focal length at the wide position, the optical system has a vari-focal ratio which is enhanced to 3 by producing negative distortion at the wide position. The optical system electrically corrects image distortion.

In the optical system according to the fourth embodiment, the first lens unit G1 and the fourth lens unit G34 are disposed at locations apart from the stop S. Such an optical system is preferable since the optical system permits reducing a burden on an actuator when lens elements are configured so as to have not circular external shapes but rectangular external shape and light weights.

A vari-focal optical system according to the fifth embodiment of the present invention has a composition illustrated in FIG. 5. In the fifth embodiment, the second lens unit G2 of each of the first through fourth embodiments is divided into a second lens unit G2 consisting of a biconvex lens component and a third lens unit G3 consisting of a cemented lens component. In other words, the optical system according to the fifth embodiment a first negative lens unit G1, a second positive lens unit G2, a third positive lens unit G3, a fourth negative lens unit G4 and a fifth positive lens unit G5. For changing a magnification from a wide position to a tele position, the first lens unit G1 is kept stationary, an aperture stop A and the second lens unit G2 are moved together on the object side, the third lens unit G3 is moved on the object side while widening and then narrowing an airspace between the second lens unit G2 and the third lens unit G3, the fourth lens unit G4 is moved on the object side while widening an airspace between the third lens unit and the fourth lens unit and then on the image side, and the fifth lens unit G5 is kept stationary together with filters F.

Though the optical system according to the fifth embodiment has a ratio of 2.8 between a focal length at the tele position and a focal length at the wide position, the optical system has a high vari-focal ratio of 3 between a field angle at the wide position and a field angle at the tele position. This optical system electrically corrects image distortion.

Figure 6:
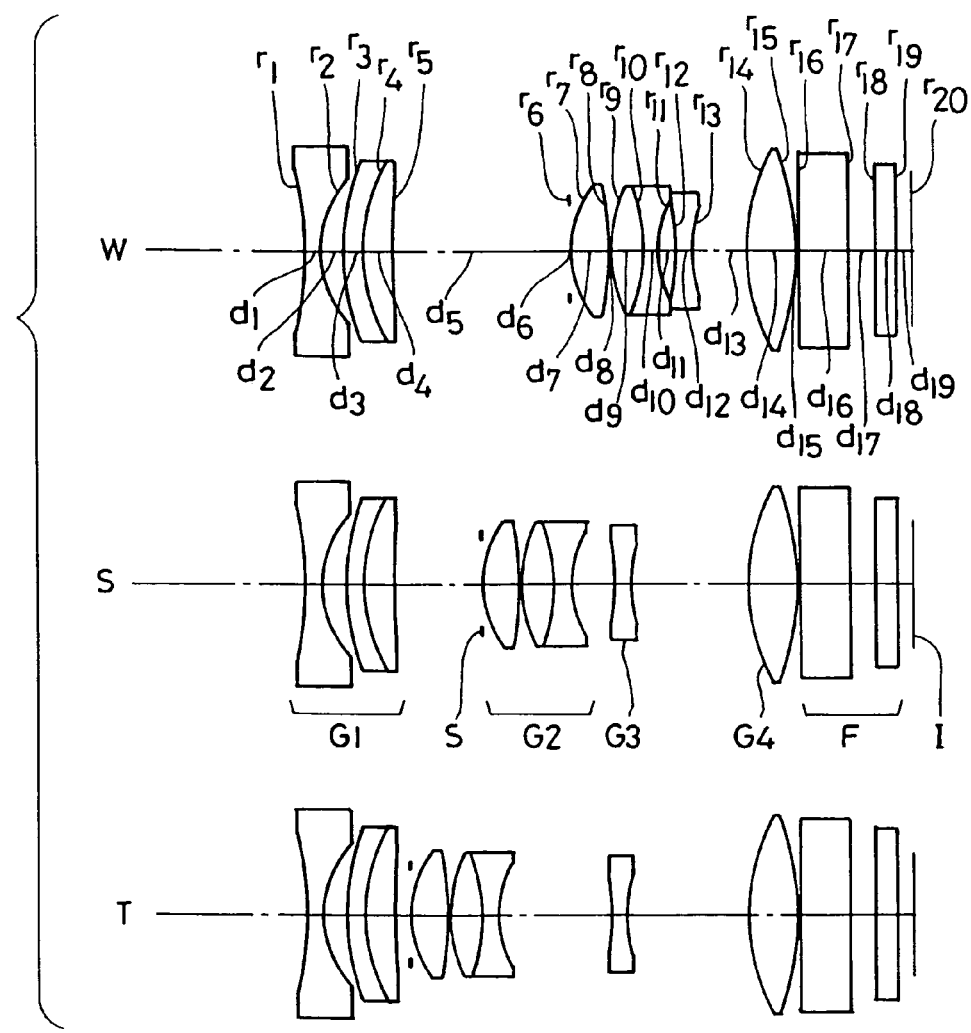
FIG. 6 is a sectional view illustrating a composition of the sixth embodiment of the present invention.

A vari-focal optical system according to the sixth embodiment has a composition illustrated in FIG. 6.

The sixth embodiment adopts a first lens unit which consists of three lens elements.

Speaking more concretely, the optical system according to the sixth embodiment consists, in order from the object side, of the first lens unit G1 which has negative refractive power as a whole, and consists of three lens element; a negative lens element and a cemented lens component consisting of a negative lens element and a positive lens element, a second positive lens unit G2, a third positive lens unit G3, and a fourth positive lens unit G4. For changing a magnification from a wide position to a tele position, the first lens unit G1 is kept stationary, an aperture stop S and the second lens unit G2 are moved together on the object side, the third lens unit G3 is moved on the object side while widening an airspace between the second lens unit G2 and the third lens unit G3 and then on the image side, and the fourth lens unit G4 is kept stationary together with filters F.

Though the optical system according to the sixth embodiment has a ratio of 2.8 between a focal length at the tele position and a focal length at the wide position, the optical system is configured so as to have a high vari-focal ratio between a field angle at the wide position and a field angle at the tele position by producing negative distortion on a side of the wide position.

Figure 7:
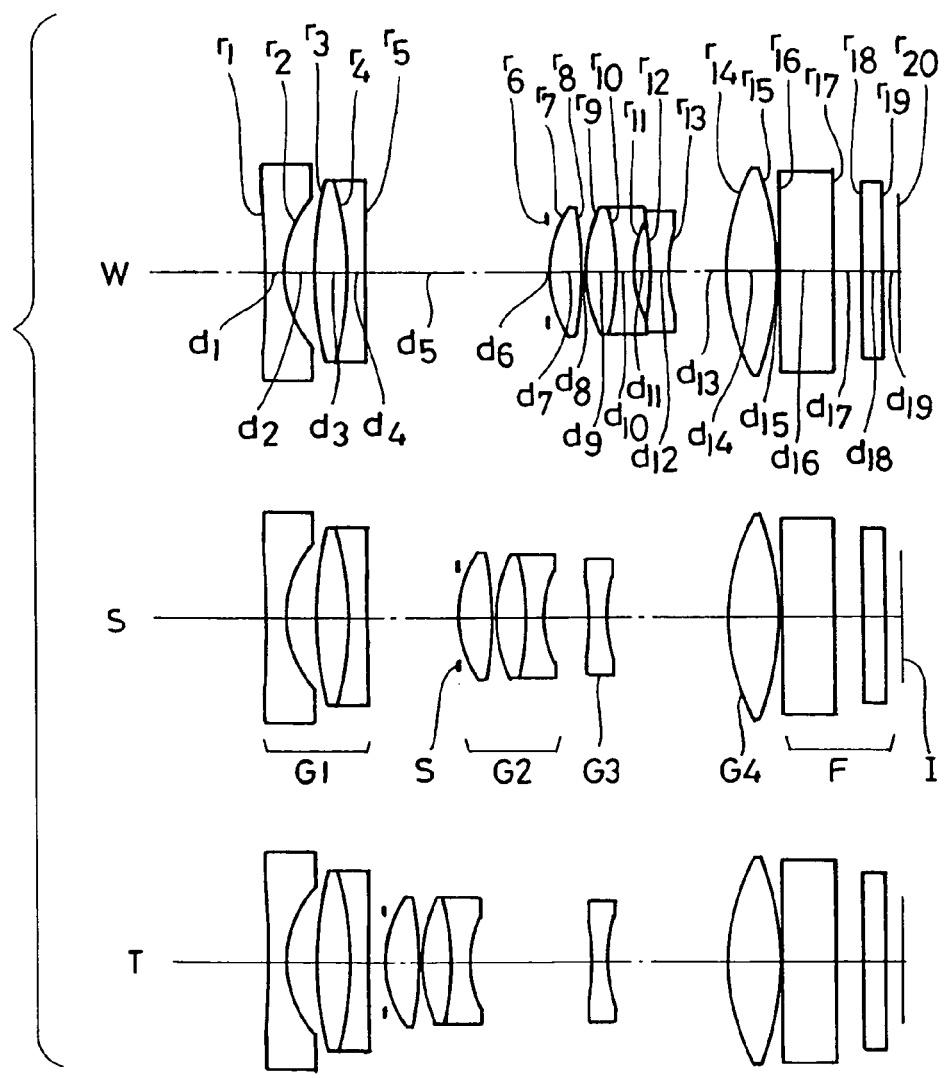
FIG. 7 is a sectional view illustrating a composition of the seventh embodiment of the present invention.

A vari-focal optical system according to the seventh embodiment has a composition as illustrated in FIG. 7 and uses a first lens unit which consists of three lens elements as in the sixth embodiment.

The seventh embodiment consists of a first negative lens unit G1, a second positive lens unit G2, a third negative lens unit G3 and a fourth positive lens unit G4. For changing a magnification from a wide position to a tele position, the first lens unit G1 is kept stationary, an aperture stop S and the second lens unit G2 are moved together on the object side and then on the image side, and the fourth lens unit G4 is kept stationary together with filters.

Though the optical system according to the seventh embodiment has a ratio of 2.8 between a focal length at the tele position and a focal length at the wide position, the optical system has a high vari-focal ration of 3 between a field angle at the wide position and a field angle at the tele position by producing negative distortion at the wide position. This optical system electrically corrects image distortion.

Figure 8:
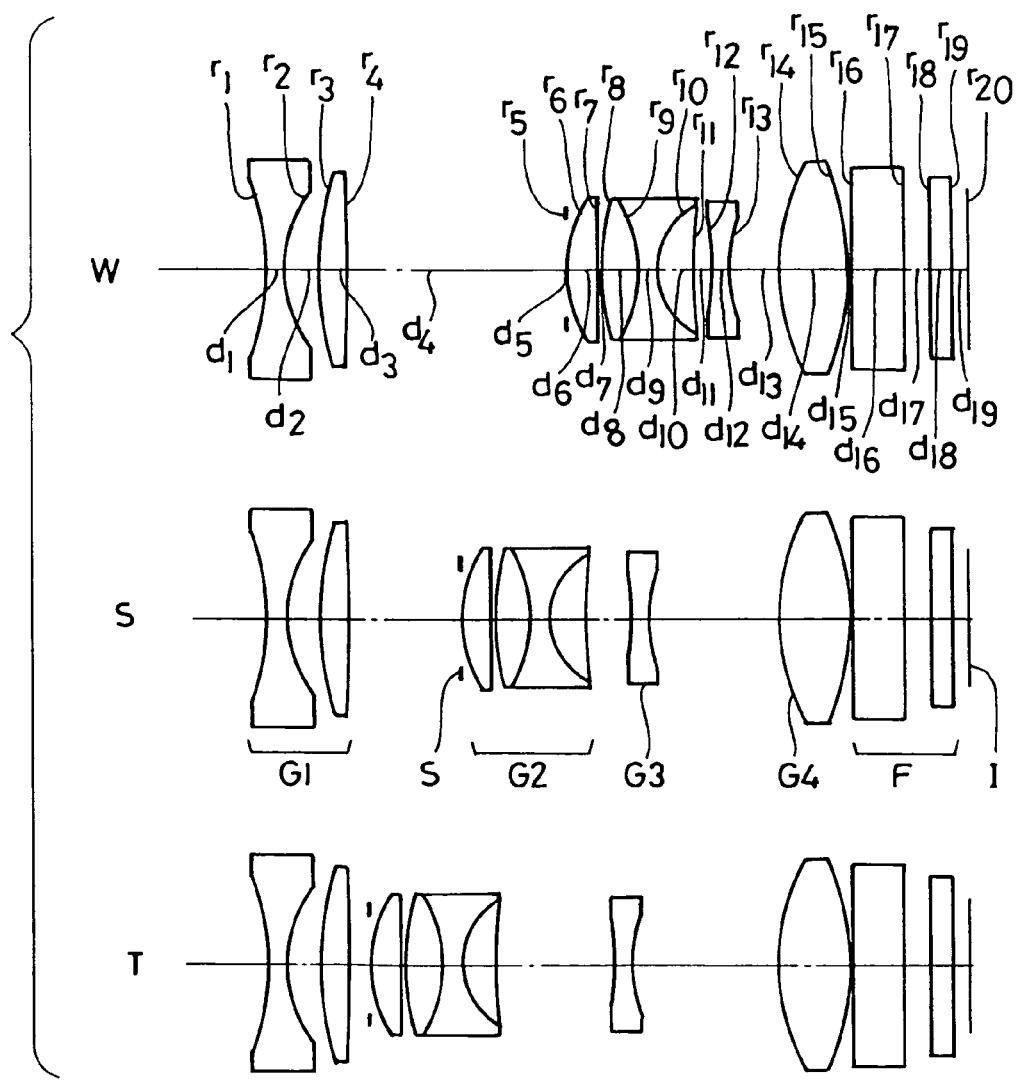
FIG. 8 is a sectional view illustrating a composition of the eighth embodiment of the present invention.

A vari-focal optical system according to the eighth embodiment has a composition illustrated in FIG. 8.

In the eighth embodiment, a second lens unit consists of four lens elements. Speaking more concretely, the eighth embodiment consists, in order from the object side, of a first negative lens unit G1, a second lens unit G2 which has positive refractive power as a whole and consists of four lens elements; a positive lens element and a cemented lens component consisting of positive, negative and positive lens elements, a third negative lens unit G3, and a fourth positive lens unit G4. For changing a magnification from a wide position to a tele position, the first lens unit G1 is kept stationary, an aperture stop S and the second lens unit G2 are moved together on the object side and then on the image side, the third lens unit G3 is moved on the object side while widening an airspace between the second lens unit G2 and the third lens unit G3 and then on the image side, and the fourth lens unit G4 is kept stationary together filters F.

Though the eighth embodiment has a ratio of 2.8 between a focal length at the tele position and a focal length at the wide position, the optical system is configured to have a high vari-focal ratio of 3 between a field angle at the wide position and a field angle at the tele position by producing negative distortion at the wide position. This optical system electrically correct image distortion.

Figure 9:
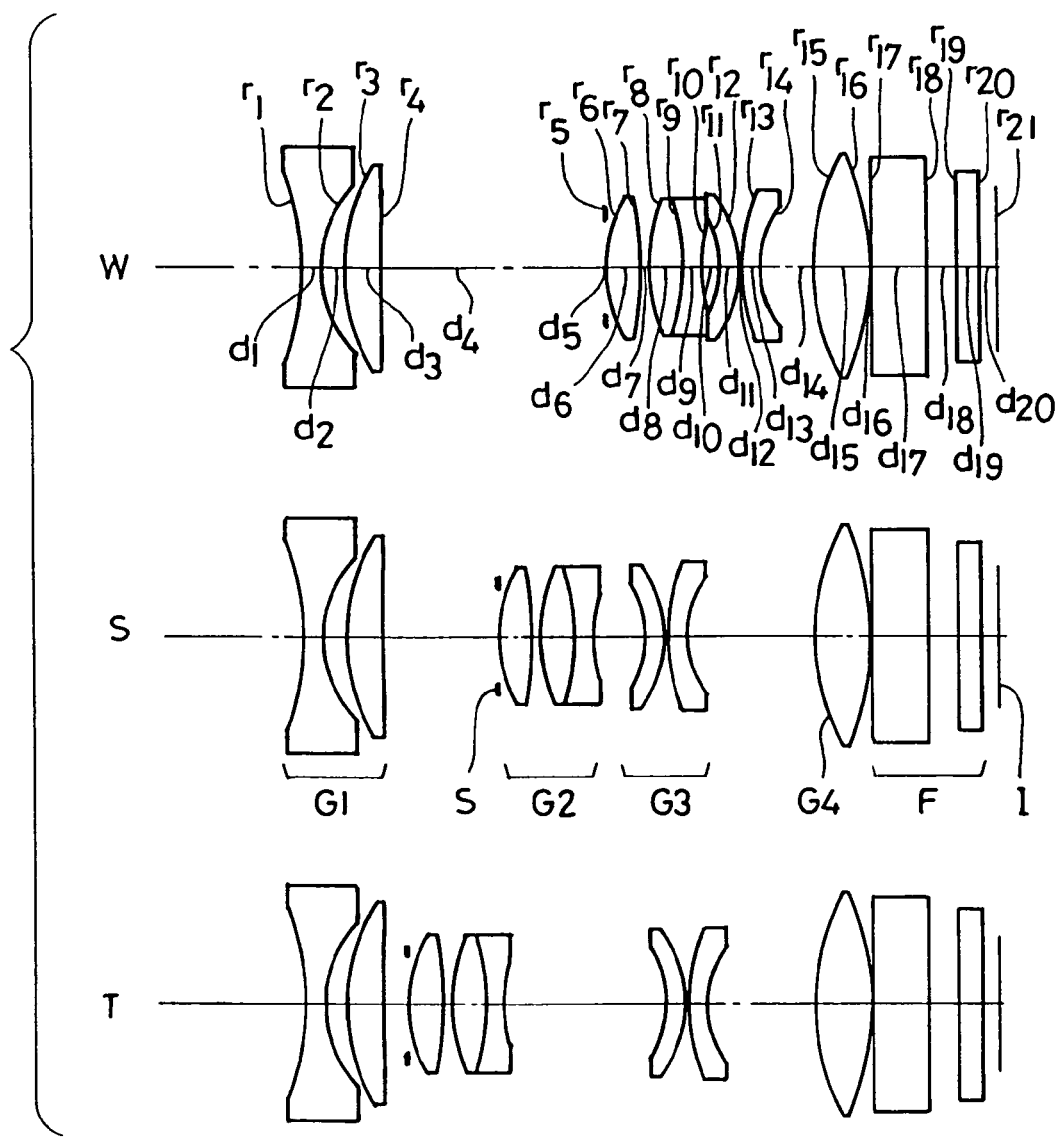
FIG. 9 is a sectional view illustrating a composition of the ninth embodiment of the present invention.

A vari-focal optical system according to the ninth embodiment has a composition illustrated in FIG. 9. In this embodiment, a third lens unit consists of two lens elements.

The ninth embodiment consists, in order from the object side, of a first negative lens unit G1, a second positive lens unit G2, a third lens unit G3 which has negative refractive power as a whole and consists of two lens elements, and a fourth positive lens unit G4. For changing a magnification from a wide position to a tele position, the first lens unit G1 is kept stationary, an aperture stop and the second lens unit G2 are moved together on the object side, the third lens unit G3 is moved on the object side while widening an airspace between the second lens unit G2 and the third lens unit G3 and then on the image side, and the fourth lens unit G4 is kept stationary together with filters F.

Though the ninth embodiment has a ratio of 2.8 between a focal length at the tele position and a focal length at the wide position, the optical system enhances a vari-focal ratio to 3 by producing negative distortion at the wide position. This optical system electrically correct image distortion.

Figure 10:
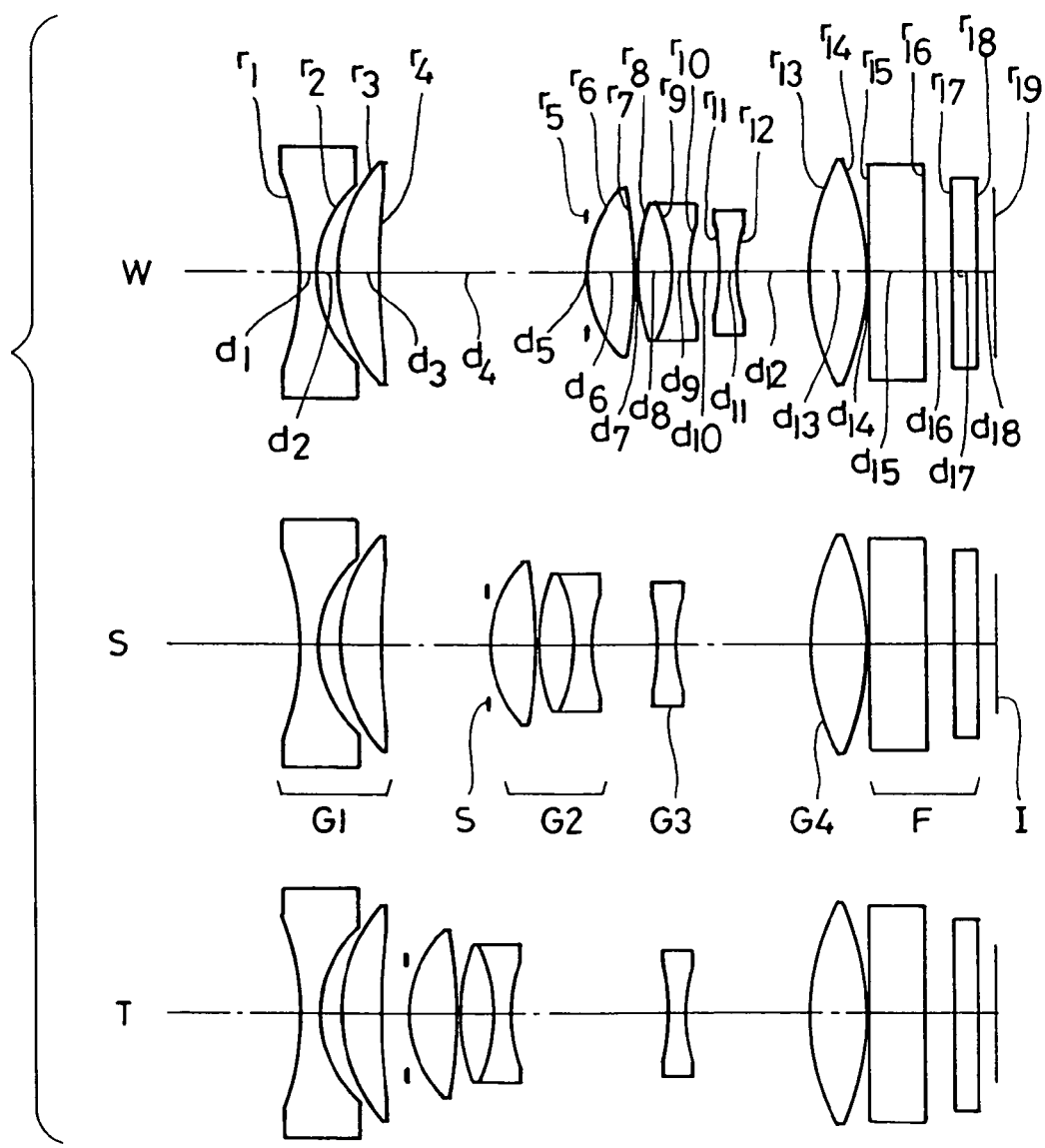
FIG. 10 is a sectional view illustrating a composition of the tenth embodiment of the present invention.

A vari-focal optical system according to the tenth embodiment has a composition illustrated in FIG. 10.

The tenth embodiment is different from the other embodiments in that the tenth embodiment uses an aperture stop which is disposed on a final surface of a second lens unit.

Speaking concretely, the tenth embodiment consists of a first negative lens unit G1, a second positive lens unit G2, a third negative lens unit G3 and a fourth positive lens unit G4. For changing a magnification from a wide position to a tele position, the first lens unit G1 is kept stationary, the second lens unit G2 is moved together with an aperture stop S on the object side, the third lens unit G3 is moved on the object side while widening an airspace between the second lens unit G2 and the third lens unit G3 and then on the image side, and the fourth lens unit G4 is kept stationary together with filters F. In this embodiment, the second lens unit G2 and the third lens unit G3 are moved for short distances, and the third lens unit G3 has a small volume.

Though the tenth embodiment has a ratio of 2.7 between a focal length at the tele position and a focal length at the wide position, the optical system has a ratio of 3 between a field angle at the wide position and a field angle at the tele position which is enhanced by producing negative distortion at the wide position.

Figure 11:
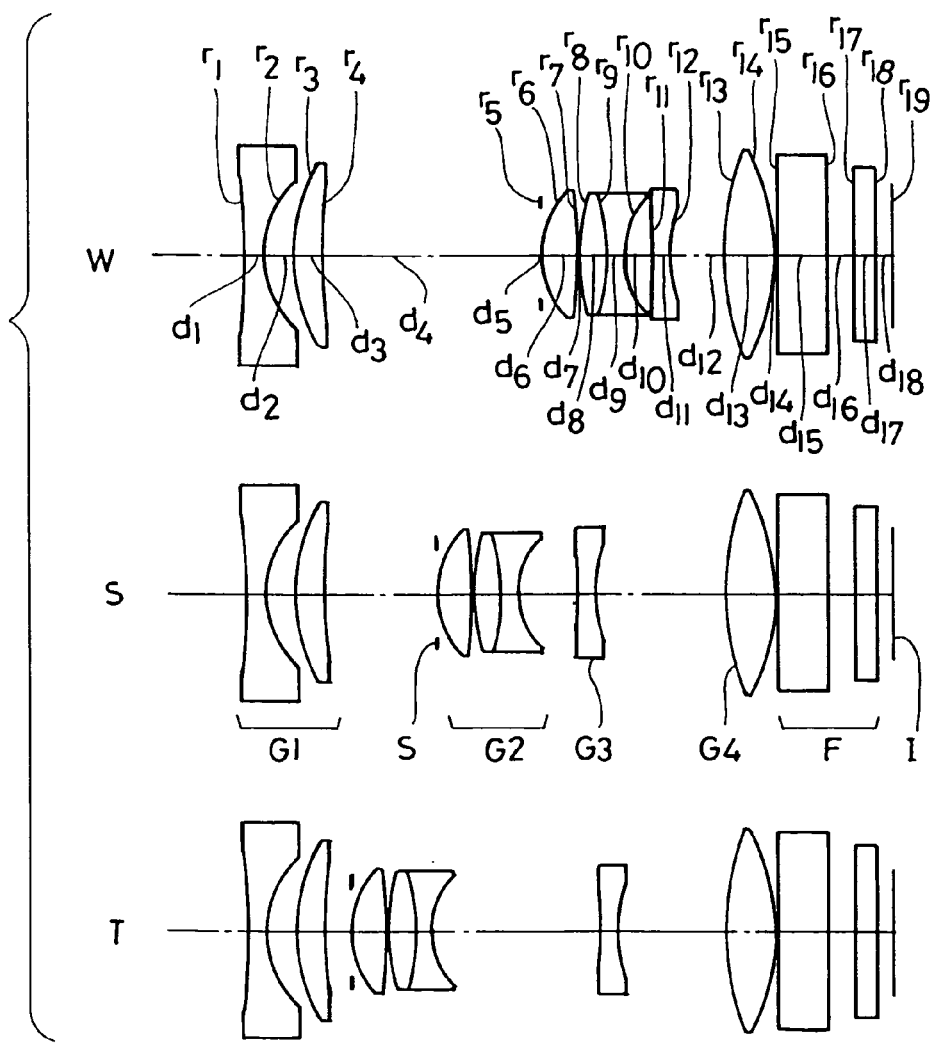
FIG. 11 is a sectional view illustrating a composition of the eleventh embodiment of the present invention.

A vari-focal optical system according to the eleventh embodiment has a composition illustrated in FIG. 11. Like the first embodiment, the eleventh embodiment consists, in order from the object side, of a first negative lens unit G1, a second positive lens unit G2, a third negative lens unit G3 and a fourth positive lens unit G4. For changing a magnification from a wide position to a tele position, the first negative lens unit G1 is kept stationery, an aperture stop S and the second negative lens unit G2 are moved together on the object side, the third negative lens unit G3 is moved on the object side while widening an airspace between the second lens unit and the third lens unit and then on the image side, and the fourth positive lens unit G4 is kept stationary together with filters F.

The eleventh embodiment corrects distortion to a level within +5% over a range from the wide position to the tele position.

Figure 12:
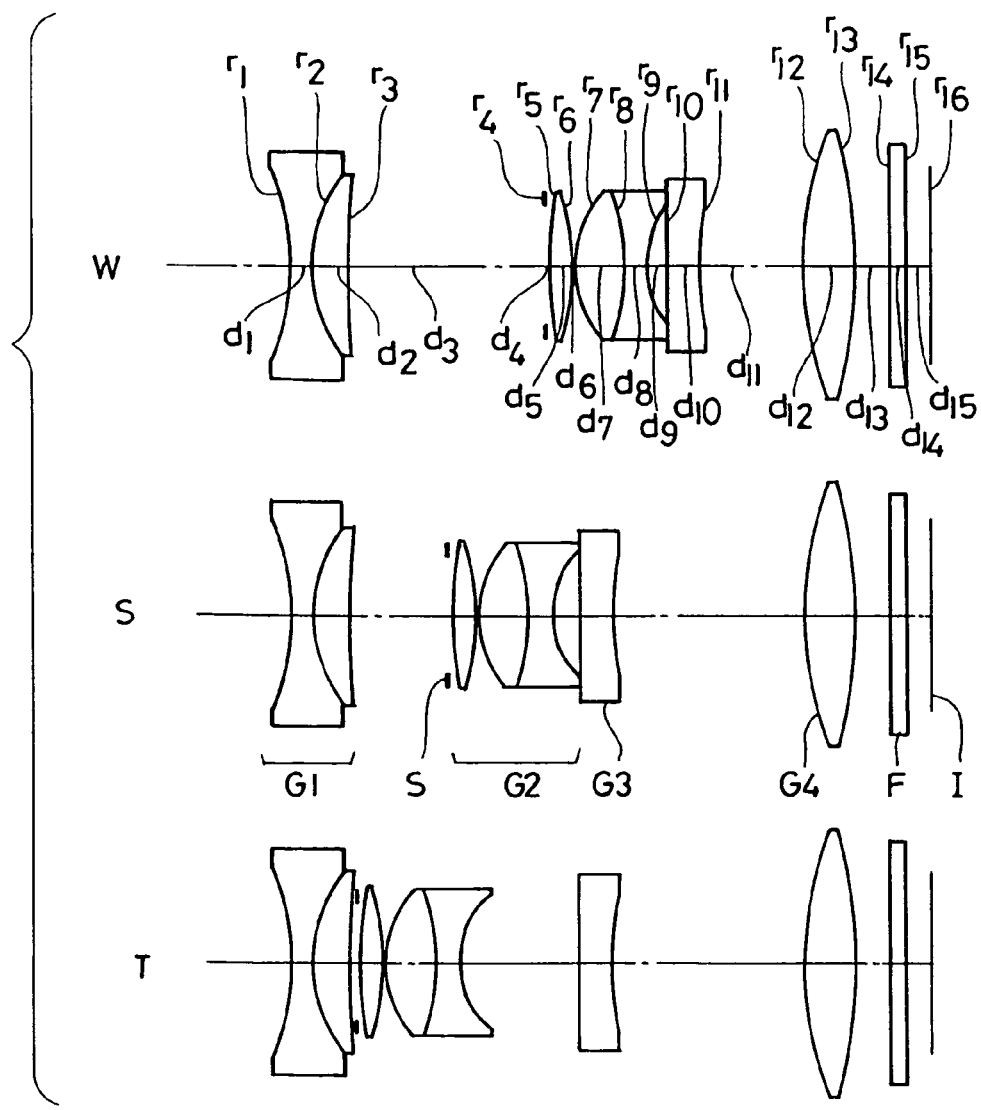
FIG. 12 is a sectional view illustrating a composition of the twelfth embodiment of the present invention.

A vari-focal optical system according to the twelfth embodiment has a composition illustrated in FIG. 12.

In the twelfth embodiment, a first lens unit consists of a cemented lens component. Speaking concretely, an optical system according to this embodiment consists, in order from the object side, of a first lens unit G1 which consists of a negative lens element and a positive lens element and has negative refractive power, a second positive lens unit G22, a third negative lens unit G3 and a fourth positive lens unit G4. For changing a magnification from a wide position to a tele position, the first lens unit G1 is kept stationary, an aperture stop S and the second lens unit G are moved together on the object side, the third lens unit G3 is moved on the object side while widening an airspace between the second lens unit G2 and the third lens unit G3 and the fourth lens unit G4 is kept stationary together with filters F.

Though the twelfth embodiment has a ratio of 2.7 between a focal length at the tele position and a focal length at the wide position, the optical system is configured to have a high vari-focal ratio of 3 between a field angle at the wide position and a field angle at the tele position. This optical system electrically corrects image distortion.

The aspherical surfaces used in the optical system according to each of the embodiments are rotationally symmetric with regard to the optical axis and expressed by the following formula when the optical axis is taken as a z axis and a distance as measured from the optical axis (z axis) is designated by h ($h^2 = x^2 + y^2$):

$$z = Ch/[1 + \{1-(1+k)C^2h^2\}^{1/2}] + ah^4 + bh^6 + ch^8 + dh^{10} + \ldots$$

wherein a reference symbol C represents a radius of curvature on a vertex (1/r), a reference symbol k designates a conical constant, and reference symbols a, b, c and a denote aspherical surface coefficients of fourth, sixth, eighth and tenth orders respectively.

Now, description will be made of examples of photographing apparatuses using the photographic optical system according to the present invention.

Figure 16:
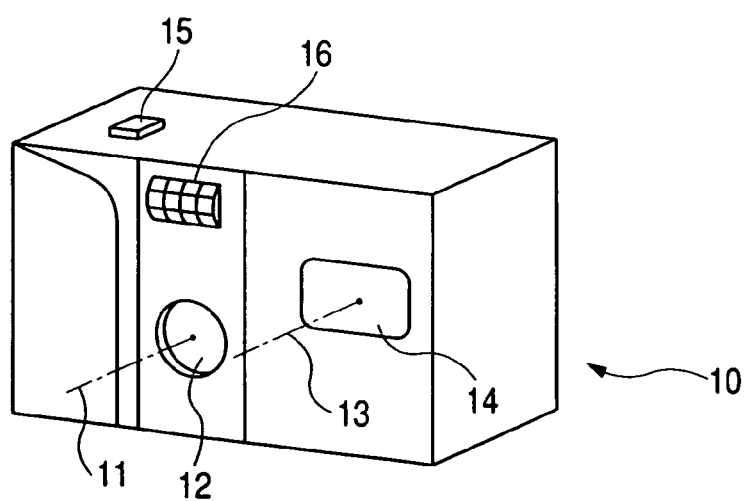
FIG. 16 is a perspective view of a camera using a photographing optical system according to the present invention as seen from a front side.
Figure 17:
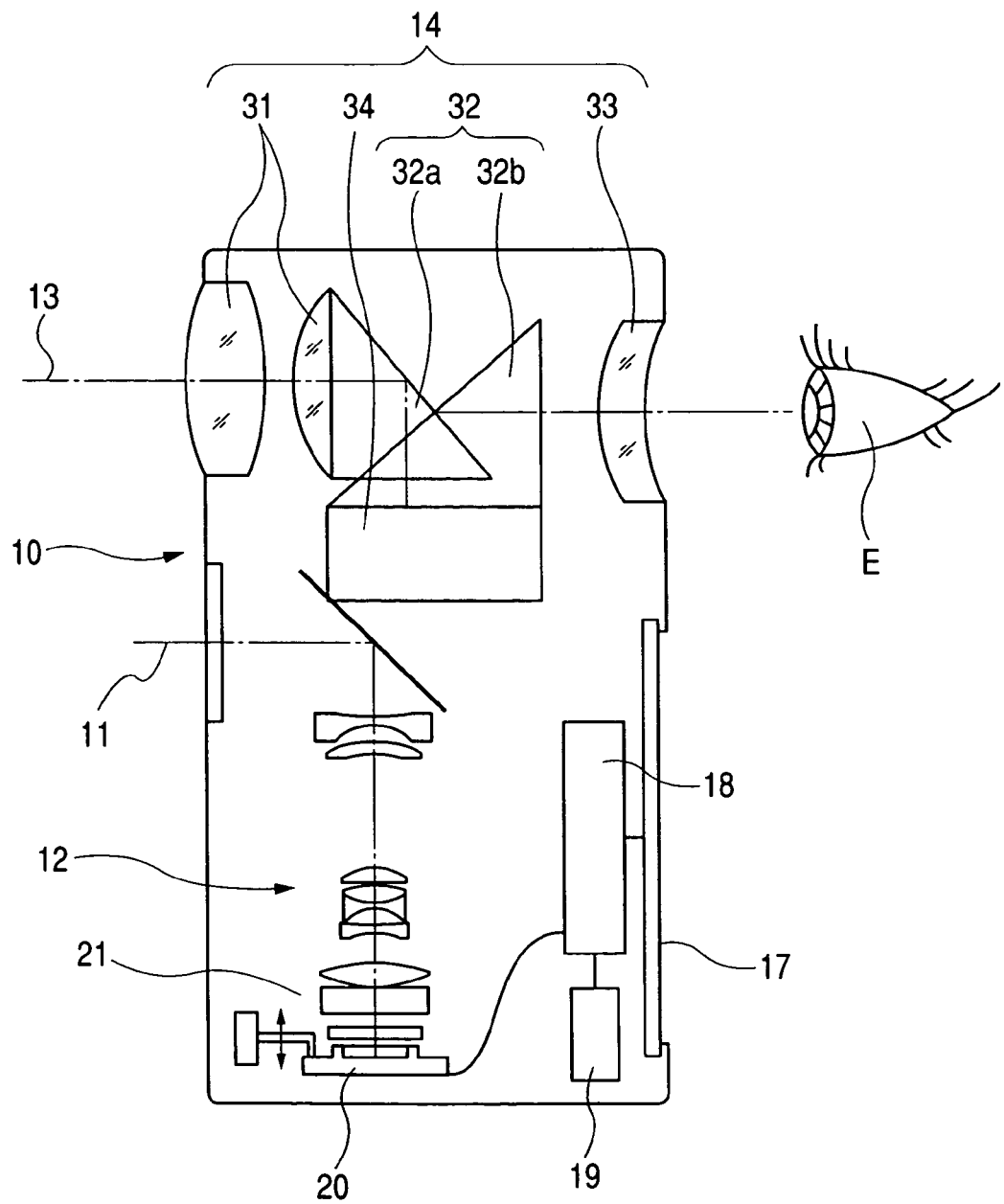
FIG. 17 is sectional view of the camera using the photographing optical system according to the present invention.

FIGS. 16 and 17 are diagrams showing an electronic camera comprising the photographic optical system according to the present invention. FIGS. 16 and 17 are a perspective view showing an appearance as seen from a front side and a sectional view respectively. As shown in these drawings, a reference numeral 10 represents an electronic camera which is equipped with a photographic optical system 12 having a photographing optical path 11, a finder optical system 14 having an finder optical path 13, a shutter 15, a flash lamp 16 and a liquid crystal display monitor 17 as shown in the drawings. In conjunction with depression of the shutter which is disposed at an upper portion of the camera 10, photographing is performed through an objective lens system 12 which is the photographic optical system according to the present invention. This photographic optical system 12 forms an image of an object on an image pickup device chip 20 such as a CCD by way of an infrared cut filter 21.

The image of the object which is received by the image pickup device chip 20 is inverted by electrically connected processing means 18 and displayed as an erected electronic image on the liquid crystal display monitor 17 disposed on a rear surface of the camera 10. Furthermore, the processing means 18 converts the erected image inverted from the image of the object picked up by the image pickup device chip 20 into electric signals and controls recording means 19 for recording electronic information. This recording means 19 may be a memory disposed in the processing means 18 or an electric recording device added to the processing means 18 as shown in the drawings.

Furthermore, the finder optical system 14 having the finder optical path 13 is equipped with a finder objective optical system 31, a Porro prism 32 for erecting the image of the object formed by the finder optical system and an eyepiece for leading the image of the object to an eyeball E of an observer. The Porro prism is divided into a front portion 32a and a rear portion 32b, a surface on which an image of an object is to be formed is disposed between the front portion 32a and the rear portion 32b, and a visual field frame 34 is disposed on the surface. The Porro prism 32 has four reflecting surfaces and erects an image of an object formed by the finder objective optical system.

Furthermore, the finder optical system 14 may be omitted in the camera 10 to reduce a number of parts of the camera 10, thereby making the camera 10 more compact and lowering a manufacturing cost of the camera 10. In such a case, the observer is to perform photographing while observing the liquid crystal monitor 17.

Figure 18:
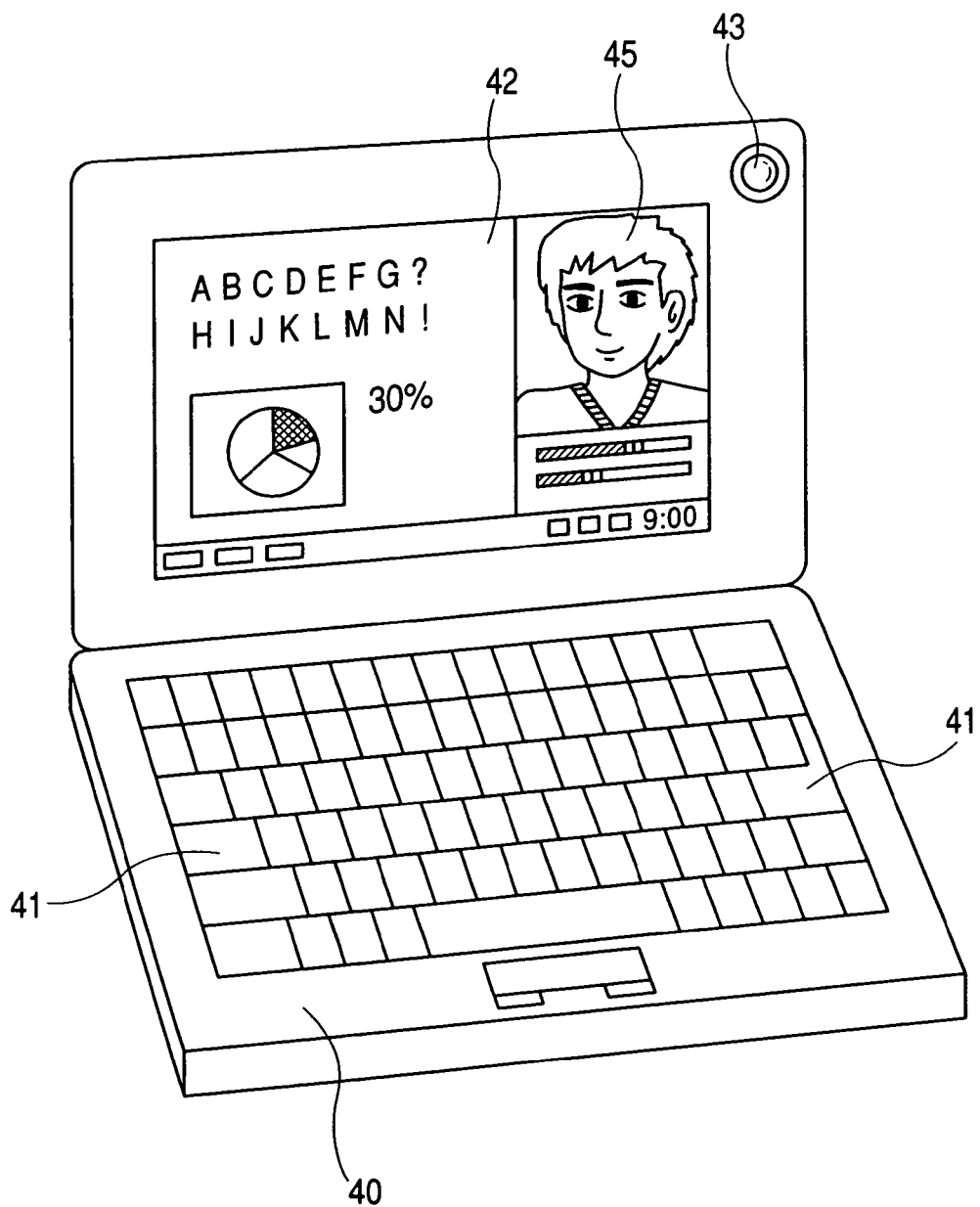
FIG. 18 is a perspective view showing a personal computer which comprises the photographing optical system according to the present invention.

Referring to FIG. 18, description will be made next of a personal computer which is an example of information processing apparatus comprising the photographic optical system according to the present invention.

FIG. 18 is a perspective view of the personal computer with a cover open as seen from a front side.

As shown in FIG. 18, a personal computer 40 has a keyboard 41 for allowing an operator to input information from outside, information processing means and recording means which are not shown, a monitor 42 for displaying the information for the operator, and a photographic optical system 43 for photographing the operator himself and his circumference. The monitor 42 may be a transmission type liquid crystal display element which is illuminated from a rear surface with a back light not shown, a reflection type liquid crystal display element which reflects rays from ax external surface for display, a CRT display or the like. Though the photographic optical system is built in a portion at right and above the monitor 42, this location is not limitative and the photographic optical system may be disposed at any location such as a circumference of the monitor 42 or the keyboard.

The photographic optical system used for the personal computer 40 consists of a photographic optical system according to the present invention 43 and an image pickup device chip for receiving an image of an object which are built in the personal computer 40.

The photographic optical system built in the personal computer 40 is focused, for example, by moving a third lens unit along an optical axis.

An image of an object which is received by the image pickup deice chip is input into processing means (CPU) of the personal computer and displayed on the monitor 42 as an erected electronic image. FIG. 18 shows an image 45 of the operator as an example of the erected electronic image. Furthermore, this image 45 can be displayed on a personal computer of a communicating mate at a remote place by way of an internet or a telephone.

Figure 19:
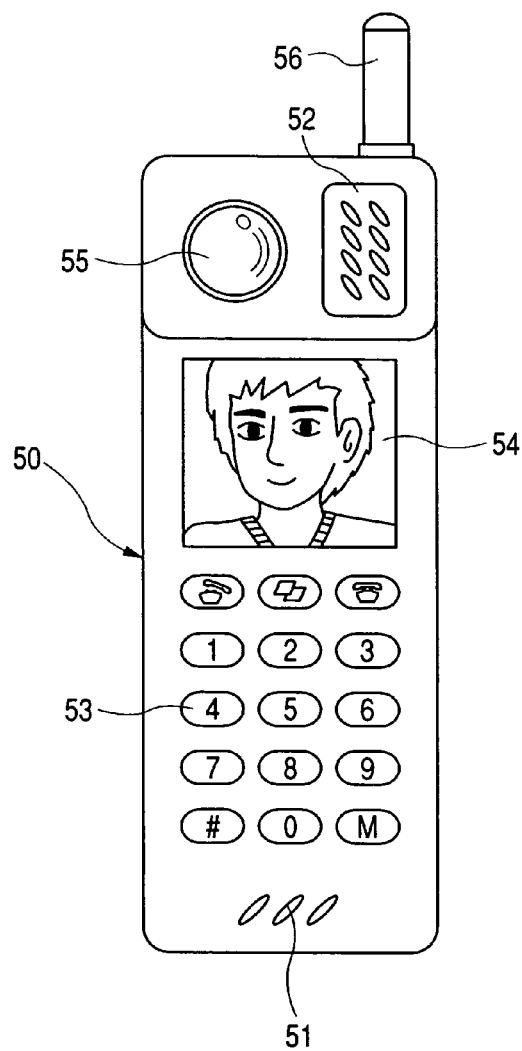
FIG. 19 is a front view of a portable telephone comprising the photographing optical system according to the present invention.
Figure 20:
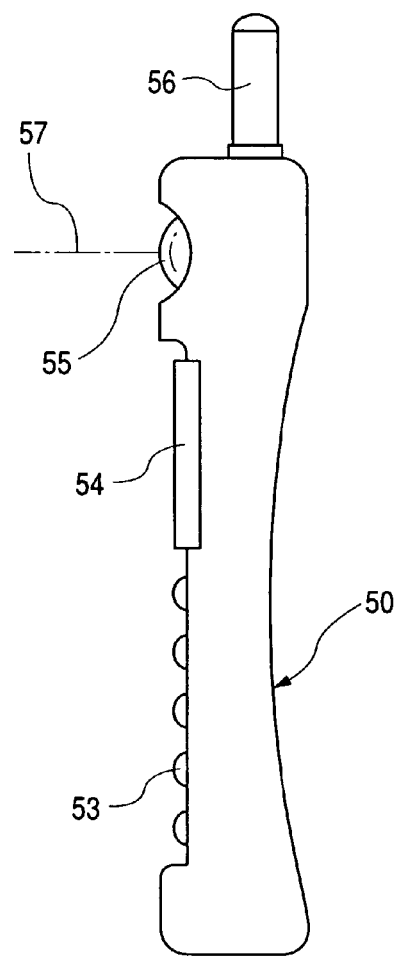
FIG. 20 is a side view of the portable telephone comprising the photographing optical system according to the present invention.

FIGS. 19 and 20 show a telephone, a portable telephone convenient for conveyance in particular, as an example of information processing apparatus which comprises the photographic optical system according to the present invention.

FIG. 19 is a front view of a portable telephone 50 and FIG. 20 is a side view of the portable telephone 50.

As shown in FIGS. 19 and 20, the portable telephone 50 has a microphone unit 51 for inputting voice of an operator as information, a speaker unit 52 for outputting voice of a communicating mate, an input dial 53 for allowing the operator to input information, a monitor 54, for example, a liquid crystal element for displaying information such as photographed images of the operator himself and the communicating mate and information such as a telephone number, a photographic optical system 55, an antenna 56 for transmitting and receiving communicating ratio waves, and processing means (not shown) for processing image information, communicating information, input signals and the like. An arrangement of component members is an example and not limitative.

The photographic optical system built in the portable telephone 50 has an objective lens system consisting of the photographic optical system according to the present invention which is disposed in a photographic optical path 57, and an image pickup device chip for receiving an image of an object. This photographic optical system is focused, for example, by moving a third lens unit along the optical axis.

An image of an object which is received by the image pickup element chip is displayed on the monitor 54, a monitor of the communicating mate or both the monitors as an image of an object which is input into the processing means and erected. Furthermore, the processing means comprises a signal processing function which converts information of the image of the object received by the image pickup device chip into transmissible signals when the image is to be transmitted to the communicating mate.

The invention claimed is:

1. A vari-focal optical system comprising in order from the object side: a first lens unit having a negative a second lens unit having a positive power a third lens unit having a negative power; and a fourth lens unit having positive power, wherein a magnification is changed from a wide position to a tele position by moving at least said second lens unit and said third lens unit along an optical axis, and wherein a front principal point of said second lens unit is located on the object side of the second lens unit.

2. The vari-focal optical system according to claim 1, wherein said first lens unit is kept stationary during the magnification change from the wide position to the tele position.

3. The vari-focal optical system according to claim 1, wherein a front principal point of said first lens unit is located on the object side of the first lens unit.

4. The vari-focal optical system according to claim 1 wherein said first lens unit consists, in order from the object side, of a negative lens component and a positive lens component, and satisfies the following conditions (1) and (2):1

$$-1.5 \leq fN/(fT \times fW)^{1/2} \leq -0.2 \quad (1)$$

$$0.4 \leq fP/(fT \times fW)^{1/2} \leq 8 \quad (2)$$

wherein a reference symbol fN represents a focal length of the negative lens component, a reference symbol fP designates a focal length of the positive lens component, a reference symbol fT denotes a focal length of the optical system as a whole at the tele position and a reference symbol fW represents a focal length of the optical system as a whole at the wide position.

5. The vari-focal optical system according to claim 1, wherein said first lens unit comprises a biconcave negative lens component.

6. The vari-focal optical system according to claim 1, wherein a radius of curvature r1 on a most object side surface satisfies the following condition (3):

$$-30 \leq r1 \quad (3).$$

7. The vari-focal optical system according to claim 1, wherein said second lens unit comprises at least two positive lens elements and a negative lens element.

8. The vari-focal optical system according to claim 1 satisfying the following conditions (4), (5) and (6):

$$0.4 \leq f21/(fT \times fW)^{1/2} \leq 3 \quad (4)$$

$$0.1 \leq f22/(fT \times fW)^{1/2} \leq 3 \quad (5)$$

$$-5 \leq f23/(fT \times fW)^{1/2} \leq -0.1 \quad (6)$$

wherein a reference symbol f21 represents a focal length of a positive lens element on a most object side in the second lens unit, a reference symbol f22 designates a focal length of a second positive lens element as counted from the object side in the second lens unit, a reference symbol f23 denotes a focal length of a negative lens element in the second lens unit, a reference symbol fT represents a focal length of the optical system as a whole at the tele position and a reference symbol fW designates a focal length of the optical system as a whole at the wide position.

9. The vari-focal optical system according to claim 1, wherein the second lens unit satisfies the following condition (A):

$$\Delta v \geq 20 \quad (A)$$

wherein a reference symbol Δv represents a difference between Abbe's numbers in the second lens unit.

10. The vari-focal optical system according to claim 1, wherein the second lens unit comprises a positive lens element and a negative lens element in succession in order from the object side.

11. The vari-focal optical system according to claim 1, wherein an image side principal point of the third lens unit is located on the image side of a final surface of the third lens unit.

12. The vari-focal optical system according to claim 1, wherein the third lens unit consists of a biconcave lens component.

13. The vari-focal optical system according to claim 1, wherein a focal length f3 of the third lens unit satisfies the following condition (9):

$$-5 \leq f3/(fT \times fW)^{1/2} \leq -0.4 \quad (9)$$

wherein a reference symbol fW represents a focal length of the optical system as a whole and a reference symbol fT designates a focal length of the optical system as a whole at the wide position.

14. The vari-focal optical system, according to claim 1 satisfying the following condition (10):

$$-9 \leq \beta 3S/\beta 2S \leq -0.5 \quad (10)$$

wherein reference symbols β2S and β3S represent magnifications of the second lens unit and the third lens unit respectively at a standard position (intermediate focal length) fS. In addition, fS is expressed as $fS=(fT \times fW)^{1/2}$ when a focal length of the optical system as a whole at the wide position is represented by fW and a focal length of the optical system as a whole at the tele position is designated by fT.

15. The vari-focal optical system according to claim 1 focused by moving the third lens unit.

16. The vari-focal optical system according to claim 1, wherein the third lens unit has a volume of 25 mm³ or smaller as measured at an effective diameter.

17. The vari-focal optical system according to claim 1, wherein the third lens unit has at least an aspherical surface.

18. The vari-focal optical system according to claim 1, wherein the second lens unit has at least an aspherical surface.

19. The vari-focal optical system according to claim 1, wherein the fourth lens unit has at least an aspherical surface.

20. The vari-focal optical system according to claim 1, wherein a most image side lens unit is kept stationary for changing a magnification from the wide position to the tele position.

21. The vari-focal optical system according to claim 1, wherein lens units which are moved for changing the magnification from the wide position to the tele position include a U-turn lens unit which is returned on the object side after being moved on the image side and a monotonously moving lens unit moved on the object side, and wherein the optical system is configured for use only at the wide position and the tele position with the U-turn lens unit kept stationary at a location for the wide position and the tele position.

22. The vari-focal optical system according to claim 1 configured to electrically correct distortion produced in the optical system.

23. The vari-focal optical system according to claim 22, wherein a maximum distortion correcting rate is 30% or lower.

24. The vari-focal optical system according to claim 22, wherein a maximum correcting magnification is 2 or lower.

25. The vari-focal optical system according to claim 22, wherein a relation between a magnification and maximum distortion has two or more peaks or valleys.

26. An information processing apparatus comprising: the vari-focal optical system according to claim 1, an electronic image pickup device disposed at a location for receiving an image of an object formed by said vari-focal optical system;
processing means for processing electronic signals photoelectrically converted by the electronic image pickup device;
an input unit for allowing an operator to input desired information signals into said processing means; a display element for displaying outputs from the processing means; and
a recording medium for processing the outputs from the processing means,
wherein the processing means is configured to display an image of an object which is formed by the vari-focal optical system and received by the electronic image pickup device.

27. A personal computer apparatus using the information processing apparatus according to claim 26, wherein an input unit is configured as a keyboard, and the vari-focal optical system and the image pickup device are built in a circumferential portion of the display element or the keyboard.

28. A telephone apparatus having comprising:
vari-focal optical system according to claim 1;
an electronic image pickup device disposed at a location for receiving an image of an object formed by said vari-focal optical system;
an antenna for transmitting or receiving telephone signals;
an input unit for inputting signals such as telephone numbers; and
a signal processing unit for converting the image of the object received by the electronic image pickup device.

29. An electronic camera apparatus comprising: the vari-focal optical system according to claim 1 comprising or removably constituting:
an electronic image pickup device disposed at a location for receiving an image of an object formed by said vari-focal optical system;
processing means for processing electronic signals photoelectrically converted by the electronic image pickup device;
a display element for visibly displaying the image of the object received by the electronic image pickup device; and
a recording member which for recording information of the image of the object received by the electronic image pickup device, wherein said processing means has a display processing function for displaying the image of the object received by the electronic image pickup device on the display element and a recording processing function for recording the image of the object received by the electronic image pickup device on a recording medium.

* * * * *

UNITED STATES PATENT AND TRADEMARK OFFICE
CERTIFICATE OF CORRECTION

PATENT NO. : 7,042,651 B2 Page 1 of 1
APPLICATION NO. : 10/885859
DATED : May 9, 2006
INVENTOR(S) : Keiichi Kuba et al.

It is certified that error appears in the above-identified patent and that said Letters Patent is hereby corrected as shown below:

Col. 45, Claim 1, line 2, insert --power,-- after "negative".

Col. 45, Claim 1, line 3, insert --,-- after "a positive power".

Col. 45, Claim 4, line 5, delete "1" after "(2):".

Signed and Sealed this

Seventeenth Day of April, 2007

JON W. DUDAS
*Director of the United States Patent and Trademark Office*